United States Patent
Santhanam et al.

(10) Patent No.: US 10,075,885 B2
(45) Date of Patent: Sep. 11, 2018

(54) CELL HISTORY UTILIZATION IN A WIRELESS COMMUNICATION SYSTEM

(71) Applicant: QUALCOMM Incorporated, San Diego, CA (US)

(72) Inventors: Arvind Santhanam, San Diego, CA (US); Leena Zacharias, San Jose, CA (US); Srinivasan Balasubramanian, San Diego, CA (US); Vishal Dalmiya, San Diego, CA (US); Shailesh Maheshwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/411,834

(22) Filed: Jan. 20, 2017

(65) Prior Publication Data
US 2018/0213454 A1    Jul. 26, 2018

(51) Int. Cl.
*H04W 36/04*    (2009.01)
*H04W 36/00*    (2009.01)
(Continued)

(52) U.S. Cl.
CPC ....... *H04W 36/04* (2013.01); *H04W 36/0033* (2013.01); *H04W 36/0083* (2013.01); *H04W 36/26* (2013.01); *H04W 36/30* (2013.01)

(58) Field of Classification Search
CPC . H04W 36/30; H04W 72/085; H04W 76/028; H04W 76/048; H04W 36/08;
(Continued)

(56) References Cited

U.S. PATENT DOCUMENTS

| 8,848,561 B2 | 9/2014 | Siomina et al. |
| 2008/0207195 A1 | 8/2008 | Ranta et al. |

(Continued)

FOREIGN PATENT DOCUMENTS

| WO | WO-2010/058076 A1 | 5/2010 |
| WO | WO-2016/060796 A1 | 4/2016 |

OTHER PUBLICATIONS

International Search Report and Written Opinion—PCT/US2017/067313—ISA/EPO—dated Mar. 22, 2018. 18 pages.
(Continued)

*Primary Examiner* — Daniel Lai
(74) *Attorney, Agent, or Firm* — Arent Fox, LLP

(57) ABSTRACT

The present methods and apparatuses may select to a cell associated with a radio access technology (RAT) in response to performing a first procedure, the first procedure including at least one of a cell selection procedure, a cell reselection procedure, or a handover procedure. The present methods and apparatuses may further acquire one or more parameters associated with the selected cell identified by a cell global identity (CGI). The present methods and apparatuses may further determine that the CGI of the cell corresponds to a stored CGI of a previous cell. Moreover, the present methods and apparatuses may perform at least one second procedure based on determining that the CGI of the cell corresponds to the stored CGI of the previous cell, the second procedure including a communication configuration procedure based at least on the one or more parameters.

27 Claims, 15 Drawing Sheets

(51) Int. Cl.
*H04W 36/30* (2009.01)
*H04W 36/26* (2009.01)

(58) Field of Classification Search
CPC .............. H04W 76/027; H04W 36/32; H04W 36/0083; H04W 36/04; H04W 36/14; H04W 36/0061; H04W 36/0094; H04W 76/02; H04W 72/02; H04W 36/00; H04W 36/26; H04W 36/0033
See application file for complete search history.

(56) References Cited

U.S. PATENT DOCUMENTS

| | | |
|---|---|---|
| 2013/0150023 A1 | 6/2013 | Kim et al. |
| 2013/0223267 A1* | 8/2013 | Jung ..................... H04J 11/005 370/252 |
| 2013/0263167 A1 | 10/2013 | Parthasarathy et al. |
| 2013/0315075 A1* | 11/2013 | Tamura ................ H04W 24/10 370/242 |
| 2014/0128058 A1* | 5/2014 | Ji ........................ H04W 76/028 455/423 |
| 2015/0029835 A1* | 1/2015 | Zhang ................... H04W 24/04 370/225 |
| 2015/0045028 A1 | 2/2015 | Singh et al. |
| 2015/0296391 A1 | 10/2015 | Kotkar et al. |
| 2016/0198340 A1* | 7/2016 | Joung ............... H04W 36/0083 370/329 |
| 2016/0219602 A1 | 7/2016 | Takeuchi |

OTHER PUBLICATIONS

Samsung: "Assistance Information for Signaling Overhead Reduction", 3GPP Draft; R2-140590, 3rd Generation Partnership Project (3GPP), Mobile Competence Centre; 650, Route Des Lucioles; F-06921 Sophiaantipolis Cedex; France, RAN WG2, Prague, Czech Republic; Feb. 10, 2014-Feb. 14, 2014, Feb. 9, 2014 (Feb. 9, 2014), XP050791913, pp. 1-3, Retrieved from the Internet: URL:http://www.3gpp.org/ftp/Meetings_3GPP_SYNC/RAN2/Docs/ [retrieved on Feb. 9, 2014].

* cited by examiner

CELL HISTORY UTILIZATION IN A WIRELESS COMMUNICATION SYSTEM

BACKGROUND

The present disclosure relates generally to communication systems, and more particularly, to cell history utilization in a wireless communications system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and MIMO antenna technology. However, as the demand for mobile broadband access continues to increase, there exists a need for further improvements in LTE technology. These improvements may also be applicable to other multi-access technologies and the telecommunication standards that employ these technologies.

In some wireless communication systems, one or more user equipments (UEs) served by an eNodeB may acquire network information related at least to characteristics of the eNodeB and/or the neighboring eNodeBs. However, only a subset of the network information may be used for network optimizations. Nonetheless, it may be desirable to acquire a wider range of network information to the network (e.g., eNodeB and related network entities). By utilizing the wider range of network information, various network entities may perform determinations for improving communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method of communication at a user equipment (UE) operating within a wireless communication network may include selecting to a cell associated with a radio access technology (RAT) in response to performing a first procedure, the first procedure including at least one of a cell selection procedure, a cell reselection procedure, or a handover procedure. The method may further include acquiring one or more parameters associated with the selected cell identified by a cell global identity (CGI). Additionally, the method includes determining that the CGI of the cell corresponds to a stored CGI of a previous cell. Moreover, the method may include performing at least one second procedure based on determining that the CGI of the cell corresponds to the stored CGI of the previous cell, the second procedure including a communication configuration procedure based at least on the one or more parameters.

In accordance with an aspect, an apparatus for communication within a wireless communication network may include a memory and at least one processor coupled to the memory. The at least one processor may be configured to select to a cell associated with a RAT in response to performing a first procedure, the first procedure including at least one of a cell selection procedure, a cell reselection procedure, or a handover procedure. Further, the at least one processor may be configured to acquire one or more parameters associated with the selected cell identified by a cell global identity (CGI). Additionally, the at least one processor may be configured to determine that the CGI of the cell corresponds to a stored CGI of a previous cell. Moreover, the at least one processor may be configured to perform at least one second procedure based on a determination that the CGI of the cell corresponds to the stored CGI of the previous cell, the second procedure including a communication configuration procedure based at least on the one or more parameters.

In accordance with an aspect, an apparatus for communication may include means for selecting to a cell associated with a RAT in response to performing a first procedure, the first procedure including at least one of a cell selection procedure, a cell reselection procedure, or a handover procedure. The apparatus may further include means for acquiring one or more parameters associated with the selected cell identified by a cell global identity (CGI). Additionally, the apparatus may include means for determining that the CGI of the cell corresponds to a stored CGI of a previous cell. Moreover, the apparatus may include means for performing at least one second procedure based on determining that the CGI of the cell corresponds to the stored CGI of the previous cell, the second procedure including a communication configuration procedure based at least on the one or more parameters.

In accordance with an aspect, a computer-readable medium storing computer executable code may include code for selecting to a cell associated with a RAT in response to performing a first procedure, the first procedure including at least one of a cell selection procedure, a cell reselection procedure, or a handover procedure. The computer-readable medium may further include code for acquiring one or more parameters associated with the selected cell identified by a cell global identity (CGI). Additionally, the computer-readable medium may include code for determining that the CGI of the cell corresponds to a stored CGI of a previous cell. Moreover, the computer-readable medium may include code for performing at least one second procedure based on determining that the CGI of the cell corresponds to the stored CGI of the previous cell, the second procedure including a communication configuration procedure based at least on the one or more parameters.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings are presented to aid in the description of various aspects of the disclosure and are provided solely for illustration of the aspects and not limitation thereof. The drawings include like reference numbers for like elements, and may represent optional components or actions using dashed lines.

DETAILED DESCRIPTION

Figure 1:
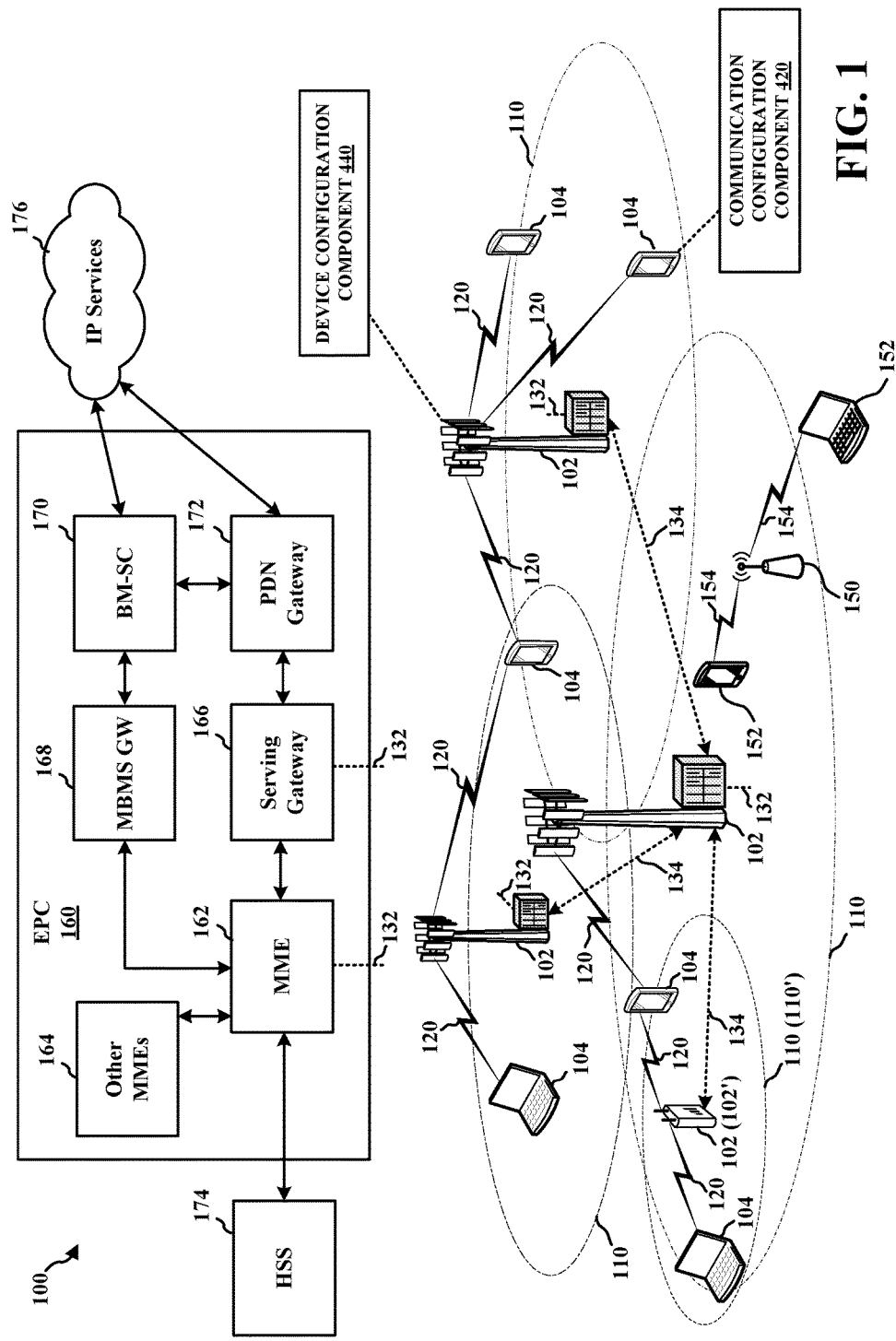
FIG. 1 is a diagram illustrating an example of a wireless communications system and an access network including a user equipment (UE) having an aspect of a device configuration component at a base station and a communication configuration component at a UE as described herein and in accordance with various aspects of the present disclosure.

The present aspects are generally related to utilizing cell history to improve user equipment (UE) network communication. In some wireless communication systems, a UE may acquire and store data related to one or more cells on which it camps on. For example, the UE may store relevant data per cell associated with at least one radio access technology (RAT). Each cell may be uniquely identified using or based on a Cell Global Identity (CGI). In some aspects, in a RAT corresponding to Long term Evolution (LTE), a CGI of an Evolved Universal Terrestrial Access Network (EUTRAN) cell may include a Public Land Mobile Network (PLMN) identifier made up of a Mobile Country Code (MCC) and a Mobile Network Code (MNC), and Cell Identifier (CI). As such, the UE may store the CGI of a particular cell on which it camps on. However, the UE may also receive or at least is capable of acquiring additional network information beneficial for UE-network communication. Nonetheless, the UE may not store and/or utilize such information in order to improve communication with the network via the camped cell any time the UE camps on that cell in future. Hence, current implementations are limited with respect to the acquisition of network information by the UE and the use of such information in optimizing UE operation on a particular cell on which the UE is camped on.

Accordingly, the present aspects provide a cell history database for improving UE-network communication. The cell history database may be utilized by the UE and/or a network entity (e.g., evolved Node B) in performing a number of communication procedures for network optimization any time the UE camps on that cell in future. For example, the cell history database may include at least a list of CGI structures that are neighbors, a list of neighbor frequencies per RAT and PLMN, a list of WLAN Basic Service Set Identifier (BSSID), a dwell time of the UE on the cell (e.g., representing a time duration the UE is camped on the cell), a number of times UE camped on a given CGI, performance metrics, as well as additional CGI information such as, but not limited to CGI capability and/or physical cell identifier (PCI). Further, the foregoing information may be classified as neighbor information, metrics per CGI, and performance metrics (e.g., throughput), where each of which may be utilized for a given communication procedure.

In some aspects, a UE may utilize the cell history information to trigger early measurement acquisition and reporting based on history of a cell on which the UE is camped on. For example, the cell may include a history of high radio link failures (RLF) at certain Reference Signal Received Power (RSRP) or Reference Signal Received Quality (RSRQ) levels. Accordingly, expedited or early handover to another more suitable cell may mitigate an RLF with the current cell and help maintain an radio resource control (RRC) connection with the network.

Further, in some aspects, a UE may utilize the cell history database to configure a neighbor frequency list to accurately reflect the neighbor cells that are deployed on a particular frequency. For instance, the UE may maintain a neighbor frequency list including a Normal Performance Group (NPG) of cells, a Reduced Performance Group (RPG) of cells, and/or an Ultra-Reduced Performance Group (URPG)

of cells. For example, an NPG and/or an RPG may be a group/list configured by a network and reflect measurement requirements specified by the network. Further, the URPG may be defined by the UE having reduced measurement requirements (e.g., relative to the NPG and RPG) based on cell history and the frequencies that have not been detected from a given CGI previously. The UE may search for one or more cells in at least one frequency of an Ultra-Reduced Performance Group (URPG) for a number of search cycles. If at least one cell is detected during the search, and the RSRP and/or RSRQ levels satisfy a respective threshold level, then the searched frequency may be added to the RPG list.

Additionally, in some aspects, one or more cells or network entities forming a cluster may be determined based at least on the information in the cell history database. For example, initially, one or more CGIs may be associated with a BSSID by camping at the same time. As such, the BSSID may be ordered according to at least one weighting parameter (e.g., which may be a product of the dwell time and the camped count value at a particular point in time). Subsequently, the CGIs associated with the BSSID may be located and ordered. The highest ordered CGI may be selected and a cluster may be determined based on a maximum edge distance between nodes (e.g., cells).

Moreover, in some aspects, one or more patterns in UE mobility may be determined based on the information stored in cell history database to optimize cell search and/or measurements in identified locations/routes. For instance, at least the dwell time, camped count (e.g., number of times the CGI was encountered), and/or a number of times reselection, handover, redirection, reestablishment and/or out-of-service has occurred between two CGIs, may be utilized to determine or otherwise detect at least one mobility pattern. In particular, the foregoing cell history information may be utilized to determine a transition probability from one CGI to another CGI and a likelihood of a subsequent hop or transition. As such, a mobility pattern such as UE route may be determined based on the transition probabilities.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. Additionally, the term "component" as used herein may be one of the parts that make up a system, may be hardware, firmware, and/or software stored on a computer-readable medium, and may be divided into other components By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 including at least one UE 104 configured to include communication configuration component 420 for configuring one or more communication parameters based on a history of one or more cells (e.g., cell of base station 102), and in accordance with various aspects of the present disclosure. The wireless communications system 100 (also referred to as a wireless wide area network (WWAN)) includes base stations 102, UEs 104, and an Evolved Packet Core (EPC) 160. The base stations 102, each of which may include device configuration component 440 for receiving cell history from each of UEs 104 and configuring one or more communication parameters based thereon, and in accordance with various aspects of the present disclosure. Further, the base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (EUTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system 100 may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, an access point, a base transceiver station, a radio base station, a radio transceiver, a transceiver function, a basic service set (BSS), an extended service set (ESS), or some other suitable terminology. The eNB 102 provides an access point to the EPC 110 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figures 2A, 2B, 2C, 2D:
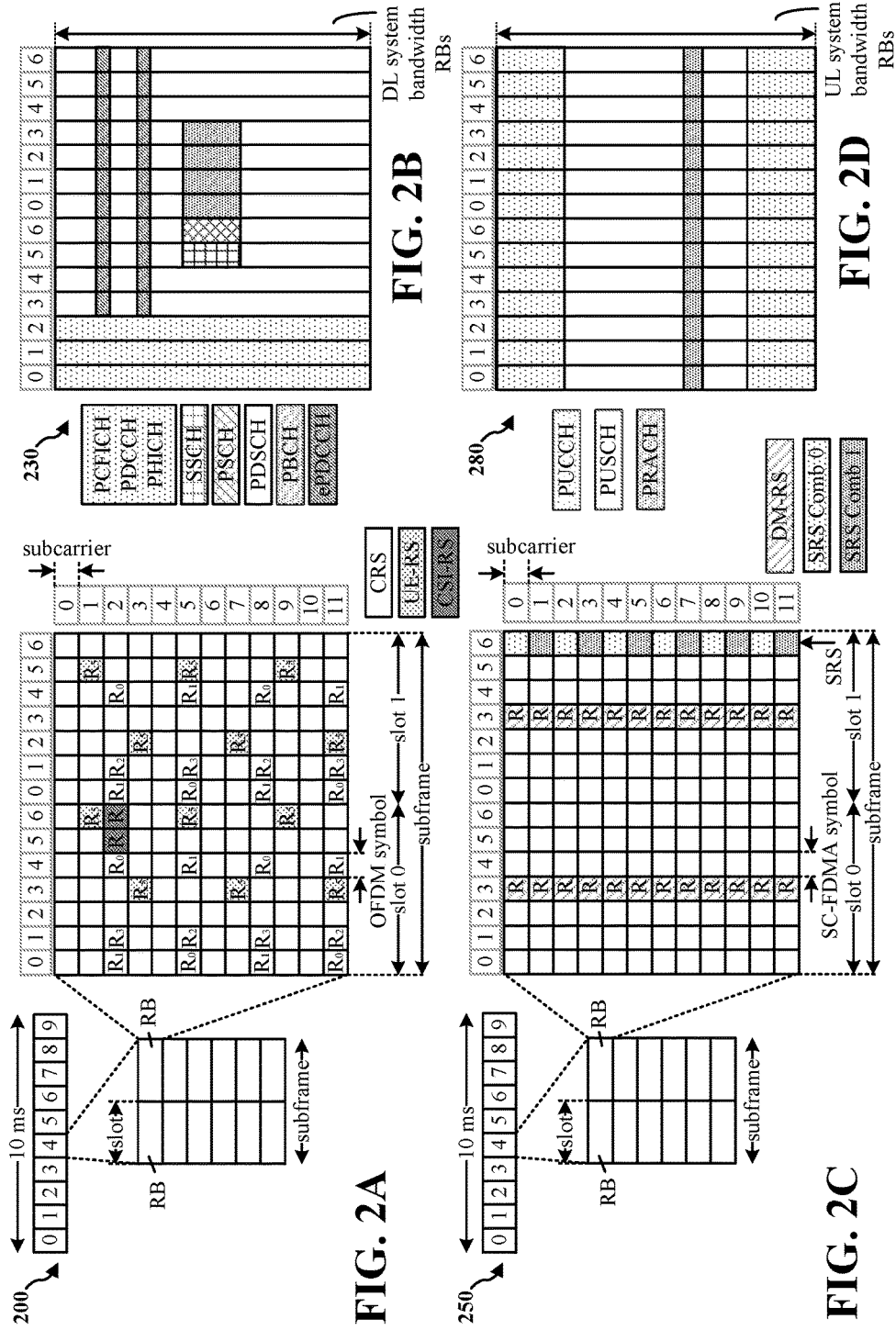
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE, which may be an example of a frame structure that may be received by at least one UE 104 including communication configuration component 420 in accordance with various aspects of the present disclosure. FIG. 2B is a diagram 230 illustrating an example of channels within the DL frame structure in LTE that may be used by UE 104 as described herein. FIG. 2C is a diagram 250 illustrating an example of an UL frame structure in LTE that may be used by UE 104. FIG. 2D is a diagram 280 illustrating an example of channels within the UL frame structure in LTE that may be used by UE 104 including communication configuration component 420 to transmit data to base station 102 including device configuration component 440 in accordance with various aspects of the present disclosure. Other wireless communication technologies may have a different frame structure and/or different channels. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS for channel estimation at the eNB, the transmission of which may be configured at or by base station 102 including resource allocation component 440 and UE 104 including reference signal configuration component 420. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
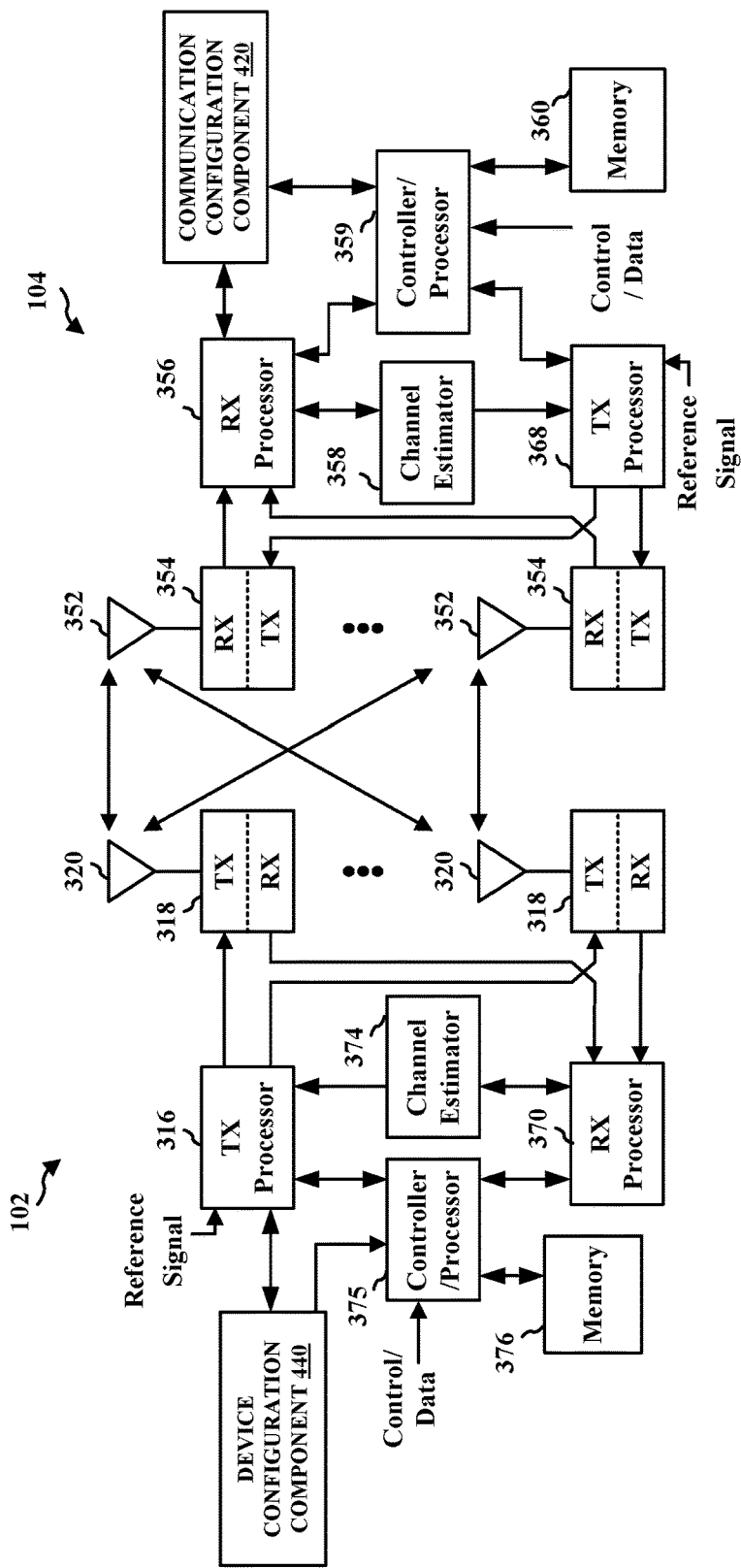
FIG. 3 is a diagram illustrating an example of an eNodeB and UE in an access network, where the UE includes an aspect of a communication configuration component and the eNodeB includes an aspect of a device configuration component as described herein and in accordance with various aspects of the present disclosure.

FIG. 3 is a block diagram of a base station 102 (e.g., eNB) in communication with UE 104 in an access network. In an aspect, UE 104 may be configured to include communication configuration component 420. In an aspect, communication configuration component 420 may configure one or more communication parameters based on cell history information received from at least base station 102. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by base station 102 including device configuration component 440, which may be configured to configure one or more communication parameters based on cell history information received from each UE (e.g., including UE 104). These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

Figure 4:
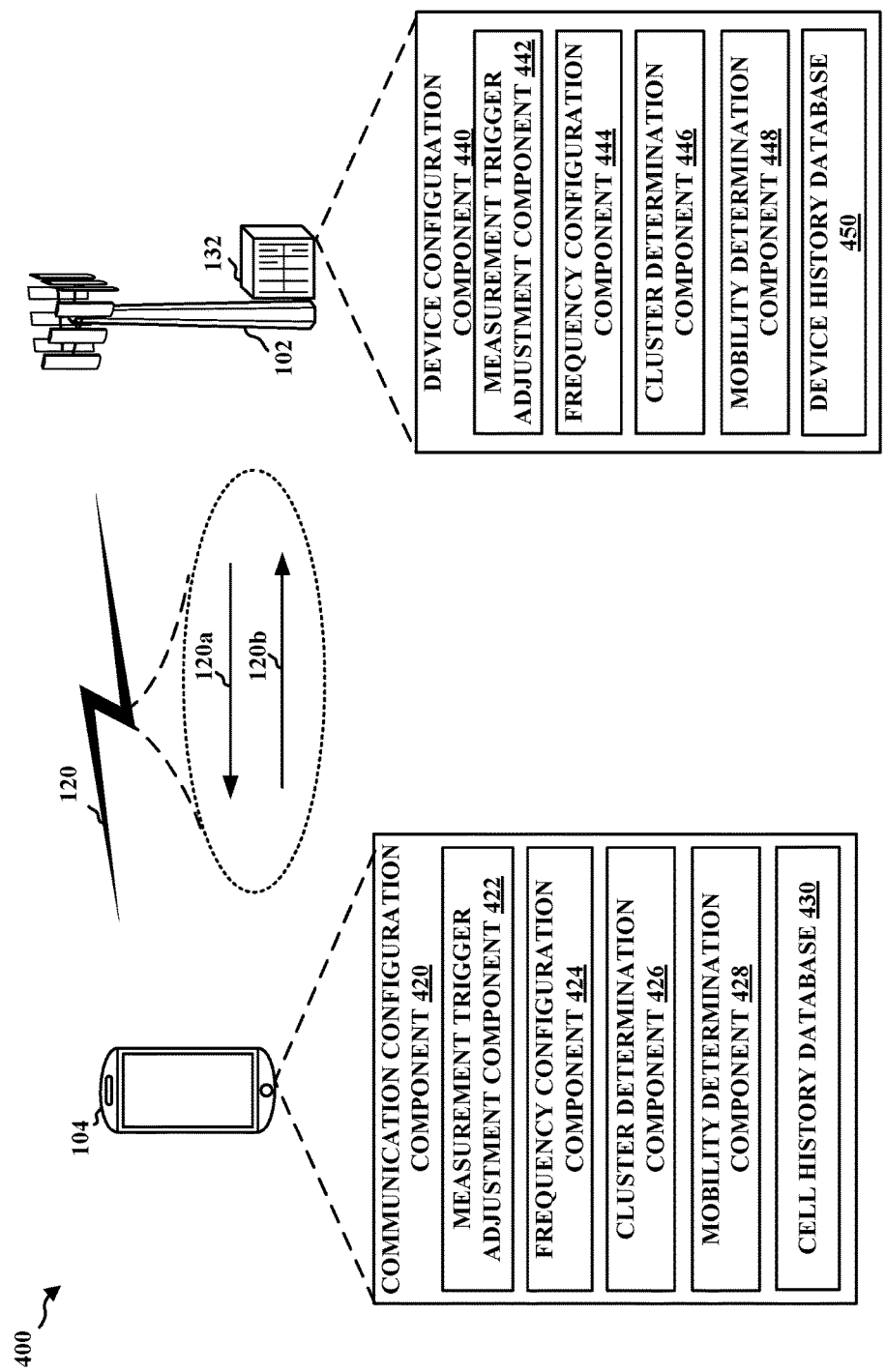
FIG. 4 is a schematic diagram of a wireless communication system including a UE having an aspect of a communication configuration component and a base station having an aspect of a device configuration component in accordance with various aspects of the present disclosure.

Referring to FIG. 4, in an aspect, a wireless communications system 400 (which may be the same as or similar to wireless communications system and an access network 100 FIG. 1) includes at least one UEs 104 in communication coverage of at least one base station 102. The base station 102 (collectively referred to as Evolved Universal Mobile Telecommunications System (UMTS) Terrestrial Radio Access Network (EUTRAN)) may interface with an EPC (such as EPC 160 of FIG. 1) through backhaul links 132 (e.g., S1 interface). In some aspects, the base station 102 may include one or more cells each associated with a RAT. In an aspect, the UE 104 may include one or more processors (not shown) and, optionally, memory (not shown), that may operate in combination with communication configuration component 420 to configure one or more communication parameters based on cell history information including parameters acquired from at least a cell associated with base station 102. The wireless communications between UE 104 and base station 102 may include signals transmitted by either the base station 102 or the UE 104 via communication links 120 and 122, respectively. For example, with respect to the communication between UE 104 and base station 102, wireless communications may include one or more downlink channels 120a transmitted by base station 102 to UE 104, and one or more uplink channels 120b transmitted by UE 104 to base station 102.

Communication configuration component 420 may be configured to configure (e.g., arrange, constitute, construct, form, assign) one or more communication parameters via, for example, measurement trigger adjustment component 422, frequency configuration component 424, cluster determination component 426, and/or mobility determination component 428, based on cell history information of at least a cell of base station 102 stored within cell history database 430. For instance, one or more UEs including UE 104 may acquire and store within cell history database 430 information for cells that it camps on. UE 104 may store the cell information per cell across one or more RATs. UE 104 may utilize the information in cell history database 430 to optimize operation and/or communication when the UE 104 camps on a cell (e.g., of base station 102) based on previous data or information of the same cell stored in cell history database (e.g., using any one of component 422, 424, 426, and/or 428).

For instance, in some aspects, UE 104 may, via measurement trigger adjustment component 422, determine non-deployed frequencies (e.g. misconfigured SIBS) and reduce scheduling rate for LTE-to-LTE and/or LTE-to-non-LTE idle search/measurement. Further, utilizing the cell history database 430, the UE 104 may, via frequency configuration component 424, trigger early measurement reporting. Additionally, the UE 104 may, via cluster determination component 426, cluster one or more cells (e.g., of base station 102) into identifiable groups based on information stored in the cell history database 430. Moreover, the UE 104 may, via mobility determination component 428, determine mobility patterns of the UE 104 based on information stored within cell history database 430.

Specifically, the cell history database 430 may include cell-specific information categorized or indexed by a CGI of the cell (e.g., of the base station 102). In addition to the CGI, the cell history database 430 may include a PLMN identifier, a cell identifier, and a corresponding RAT of the CGI. Each time the UE 104 camps on or establishes an (RRC) connection to a new CGI, the cell-specific information may be added to the cell history database 430. However, in some aspects, the cell history database 430 may be limited to a number of recent CGIs. As such, when the cell history database 430 exceeds a maximum CGI storage amount, the communication configuration component 420 may remove the oldest or least dwelled CGI out of the earliest encountered cells from the cell history database 430.

Further, for each CGI stored in cell history database 430, communication configuration component 420 may determine a camped count value representing a number of selections of the cell by the UE 102 and a dwell time value representing a time duration the UE 102 is camped on the cell (e.g., of base station 102). In some aspects, the dwell time may be determined or otherwise represented as:

$$DWELL\_TIME = DWELL\_TIME \times (1-\alpha) + DWELL\_TIME\_CURRENT \times \alpha$$

As such, communication configuration component 430 may determine a total dwell time value based on the dwell time value and the camped count value. Further, for example, the cell history database 430 may include a neighbor CGI list that includes a list of CGI structures that are neighbors of a cell of base station 102.

In some aspects, a neighbor cell CGI may be added to the cell history database 430 each time UE 104 performs or undergoes cell selection, reselection, handover, redirection, reestablishment, or an out-of-service scenario. Further, the neighbor CGI list may include a link or association between a source and destination CGI. In some aspects, the neighbor CGI list may be limited to a number of recent neighbor CGIs. As such, when the neighbor CGI list exceeds a maximum neighbor CGI storage amount, the communication configuration component 420 may remove the CGI with a least number of reselection, handover, redirection, reestablishment, and/or out-of-serve scenarios out of the earliest number of encountered CGI from the neighbor CGI list.

In some aspects, the neighbor CGI list may also include an inter-RAT count per CGIs. In particular, the inter-RAT count may represent a number of reselections, handovers, redirections, reestablishments, and/or out-of-service scenarios which have occurred between two CGIs. The inter-RAT count values may represent a connection scenario in one or both directions between two CGIs. Additionally, the cell history database 430 may include a neighbor frequency list that includes a list of neighbor frequencies per RAT and PLMN.

The cell history database 430 may include a WLAN basic service set identifier (BSSID) list that includes at least a list of Wi-Fi BSSIDs. Further, each BSSID may be associated with a dwell time value and a camped count value. The cell history database 430 may also include, per CGI, detailed CGI information that includes CGI capability information, EUTRA absolute radio frequency channel number (EARFCN), PCI, dwell time value, and/or camped count value.

Moreover, the cell history database 430 may include performance metrics such as, but not limited to, voice call media metrics, signal quality metrics, bad event metrics, and/or throughput metrics. An example listing of information stored in cell history database 430 is shown in Table 1.

TABLE 1

Example Information in Cell History Database 430

| Indexed Item | Neighbor Information | Metrics per CGI | Performance metrics |
|---|---|---|---|
| CGI (on G/W/T/L) | NEIGHBOR_CGI_LIST<br>IRAT_COUNT<br>Sync vs asynchronous<br>NEIGHBOR_FREQ_LTE_PLMN_LIST<br>WIFI_BSSID_LIST | DWELL_TIME<br>CAMPED_COUNT<br>Idle<br>Connected<br>CGI_DETAILED_INFO<br>Tracking area code<br>VoPS vs non-VoPS<br>Features configured on cell (MIMO, CA, eMBMS, UDC, LWA, LAA)<br>CGI_SIZE<br>MOBILITY_TYPE<br>EARFCN/PCI<br>Bandwidth | THROUGHPUT_METRICS<br>VOICE_CALL_METRICS<br>BAD_EVENT_COUNT_LIST |

In an aspect, measurement trigger adjustment component 422 may be configured to trigger early measurement acquisition and reporting based on information stored in the cell history database 430. For example, measurement trigger adjustment component 422 may apply a bias to RSRP value(s) and/or a TTT value that triggers the measurement acquisition and reporting for cells with a history of RLF, and in particular zone within the cells that may have higher occurrences of RLF. Additionally, for such cells or in zones, a faster cell search for larger DRX cycles may also be beneficial. As such, triggering early measurement acquisition and reporting may save voice or data calls.

Measurement trigger adjustment component 422 may utilize RLF occurrence information (e.g., RLF occurrence value) representing a number of occurrence of RLF on a particular CGI (e.g., cell of base station 102). Measurement trigger adjustment component 422 may determine one or more zones based at least on a binned RSRP values (e.g., in fixed units of dB) of the serving cell (e.g., cell of base station 102) and a number of neighbor LTE cells. In some aspects, a bin may also be referred to as an RLF classifier value corresponding to a distinct RSRP range associated with an occurrence of an RLF within the distinct RSRP range.

As such, a bin may correspond to a range of RSRP values. For example, for the range 'RSRP_range_min to RSRP_range_max', bin 0, which may corresponding to the serving cell, may be 'RSRP_range_max, RSRP_range_max+RSRP_bin_unit'. Further, a bin index may be determined based on 'int((RSRP_range_max−RSRP_serving)/RSRP_bin_unit)'. Additionally, the bin index k may be pre-defined as kth bin in increments of RSRP_bin_unit within the range.

Specifically, to determine zone related information, measurement trigger adjustment component 422 may identify the bins corresponding to an RSRP value of the serving cell, an RSRP value of a first neighbor cell, and/or an RSRP value of a second neighbor cell. That is, every time an RLF occurs at an RSRP value (or at an RSRP value where RLF occurs), measurement trigger adjustment component 422 may identify a particular bin associated with that zone.

Measurement trigger adjustment component 422 may then translate the determined bin information into a zone. For example, once bin information is obtained, measurement trigger adjustment component 424 may determine one or more zones associated with a particular cell as a function of the cell identifier (e.g., CGI) of that cell and the bin. For example, using the representation 'Zone($\{C_i\},\{n_i\}$)', RSRP_serving for cell C0 may fall in bin n0, RSRP_neighbor1 for cell C1 may fall in bin n1 and RSRP_neighbor2 for cell C2 may falls in bin n2. In some aspects, a zone may be a polygon representation formed by 'n' vertices having an RSRP value within a certain range.

In some aspects, rather or in addition to using the RSRP values of the cells (e.g., serving and neighbor cells), measurement trigger adjustment component 422 may utilize global positioning system (GPS) values.

Measurement trigger adjustment component 422 may utilize the zone information to determine whether the UE 104 has camped on a cell and/or entered a zone where previous RLFs were encountered. That is, when the RLF occurrence value meets or exceeds an RLF occurrence threshold value representing a number of RLF indicative of poor a communication environment, measurement trigger adjustment component 422 may determine whether the current serving CGI and/or the neighbor PCI are the same as any saved zone stored within cell history database 430. Based on a determination that the current serving CGI and/or the neighbor PCI are found in cell history database 430, measurement trigger adjustment component 422 may determine whether the current RSRP values (e.g., of the serving and neighbor cells) are within an offset of the stored RSRP values of any of the zones identified using the cell history database 430. For example, a current location of the UE 104 may fall within a zone based on: 'RSRP_serving filtered−offset<=RSRP_serving<=RSRP_serving filtered+offset' and 'RSRP_neighbor1 filtered−offset<=RSRP_neighbor1<=RSRP_neighbor1 filtered offset' and 'RSRP_neighbor2 filtered−offset<=RSRP_neighbor2<=RSRP_neighbor2 filtered+offset'.

Measurement trigger adjustment component 422 may trigger early measurement acquisition and reporting based on determining that the UE 104 may or has entered a location or zone where previous RLFs were encountered. For example, measurement trigger adjustment component 422 may apply a bias to the serving cell measurements so as to adjust the RSRP values. Specifically, measurement trigger adjustment component 422 may reduce one or both of the RSRP value or the RSRQ value by a corresponding constant value (e.g., rsrpCurrent=rsrpCurrent−K1 and/or rsrqCurrent=rsrqCurrent−K2), and/or may modify a TTT value (e.g., reduce the TTT value to a lower value such as, but not limited to, 40 ms).

Additionally, measurement trigger adjustment component 422 may also adjust the measurement report parameters of one or more neighbor cells (e.g., for Voice over LTE (VoLTE) scenarios). For a neighbor cell that is detected (mapping from PCI to neighbor CGI from the cell history database 430) and has a high RLF rate (e.g., as determined by comparing the RLF occurrence value of the neighbor cell to the RLF occurrence threshold value), the measurement values and/or the TTT value of the neighbor cell may be adjusted. For instance, the measurement trigger adjustment component 422 may reduce one or both of the RSRP value or the RSRQ value by a corresponding constant value (e.g., rsrpCurrent of neighbor=rsrpCurrent of neighbor−K3 and/or rsrqCurrent of neighbor=rsrqCurrent of neighbor−K4). Additionally, in some aspects, for data calls, W/L neighbor cells may be detected. Further description regarding aspects related to the measurement trigger adjustment component 422 are described herein with respect to FIG. 5.

Further, frequency configuration component 424 may be configured to utilize the neighbor frequency list in the cell history database 430 to determine a list of detected frequencies having at least one cell. For example, in some aspects, a network may not configure neighbor frequencies correctly based on available coverage. Further, the UE 104 may receive misconfigured SIBS that contains frequencies that are not deployed, which may result in unnecessary searches on frequencies where no cells exist. As such, to reduce unnecessary searches, the frequency configuration component 424 may store, in cell history database 430, a list of frequencies that were detected on each cell.

Specifically, frequency configuration component 424 may search for cells on a particular frequency included in an ultra-reduced performance group (URPG) list. The URPG list may include a list of frequencies for which at least one cell has not been detected by the UE 104. UE 104 may also include a normal performance group (NPG) list and a reduced performance group (RPG) list. Frequency configuration component 424 may select a number of URPG frequencies from the RPG list. Specifically, frequency configuration component 424 may select frequencies that may not be present in an acquisition database (e.g., list of frequencies which the UE 104 has camped on recently) or in the neighbor frequency List in the cell history database 430.

Frequency configuration component 424 may periodically search for at least one cell for or in a given URPG frequency. In particular, frequency configuration component 424 may append a URPG frequency to the RPG frequency list for a given number of periodic searches. Frequency configuration component 424 may determine whether at least one cell is detected in the URPG frequency during the total search duration. Based on determining that at least one cell is detected, frequency configuration component 424 may then determine whether the at least one cell satisfies a suitable cell criteria (e.g., whether RSRP/RSRQ values of the detected cell satisfies a corresponding quality threshold). If the at least one cell satisfies the suitable cell criteria, frequency configuration component 424 may move or add the frequency to the RPG list. However, if frequency configuration component 424 determines that either no cell is detected in the URPG frequency or at least one detected cell does not satisfy the suitable cell criteria, then the URPG frequency is kept or moved back to the URPG list.

In some aspects, frequency configuration component 424 may determine a list of frequencies having at least one cell for evolved MTC devices that are stationary and have less chance of detecting frequencies.

Additionally, cluster determination component 426 may be configured to determine a cell cluster representing a group of cells that the UE 104 frequently establishes and maintains a connection. In other words, cluster determination component 426 may determine a frequently dwelled cluster of cells such as, but not limited to, cells at home and office locations, as well as other frequently visited locations. In determining or identifying such clusters, communication configuration component 429 may not only optimize performance (e.g., VoLTE) with a serving cell within the cluster, but also the other cells within the cluster.

Figure 7:
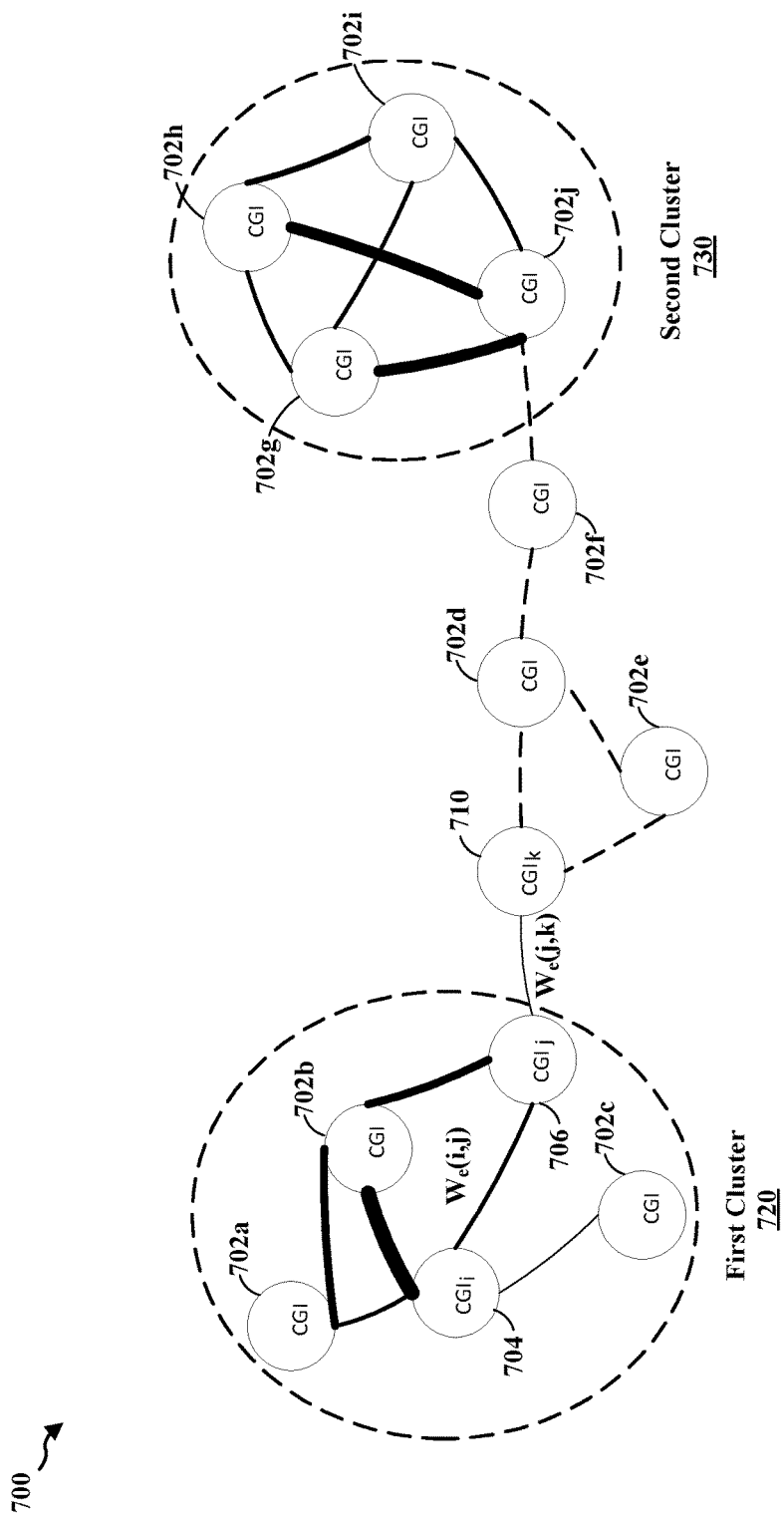
FIG. 7 is a conceptual diagram illustrating an aspect of a clustering representation in accordance with various aspects of the present disclosure.

Cluster determination component 426 may utilize dwell time information, camped count information, and inter-RAT count information from the cell history database 430 in forming the clustering determination. For example, as shown in FIG. 7, an example weighted graph diagram may be formed where each CGI corresponds to a vertex and an edge may be formed between each CGI and a neighbor CGI. Further, a weight of a vertex that represents a total dwell time at the corresponding CGI may be determined based on $w_v(i)=\text{DWELL\_TIME}(i) \times \text{CAMPED\_COUNT}(i)$. Additionally, a weight of an edge between two CGIs (e.g., vertex$_i$ and vertex$_j$) may represent a number of times the UE 104 handed over between two CGIs/cells and may be determined based on $w_e(i,j)=\text{IRAT\_COUNT}(i,j)$.

Cluster determination component 426 may determine a total dwell time value for each of one or more WLAN identifiers based on a dwell time value and a camped count value. In some aspects, the WLAN identifiers may correspond to Wi-Fi BSSIDs. Cluster determination component 426 may rank the one or more WLAN identifiers based on the respective total dwell time value. Cluster determination component 426 may determine at least one CGI that is associated with a subset of the one or more WLAN identifiers and rank each of the at least one CGI that is associated with the subset of the one or more WLAN identifiers based at least on a weight value of each of the at least one CGI. The ranking of the CGIs may be performed according to the following expression:

$$w_v(i) + \Sigma_{j \in \text{one-hop neighbors of } i} w_v(j)$$

Cluster determination component 426 may select a highest CGI as a root node of the cluster. Cluster determination component 426 may subsequently determine a cluster based on the root node and a max depth of at least two edges. A node may be admitted to the cluster if there is an edge to a node in the cluster satisfying $W_e(i,j)>$threshold value. Cluster determination component 426 may select a next highest CGI as a another root node of different cluster and may determine the cells forming the cluster that have a maximum depth of two edges. Upon determining the clusters within the cell history dataset, an example representation of the clusters may be formed as in FIG. 7.

Moreover, mobility determination component 428 may be configured to determine patterns in UE 104 mobility. For example, mobility determination component 428 may determine UE 104 patterns such as UE 104 movement from home to office and back periodically. As such, mobility determination component 428 may optimize search/measurement procedures not just on a single cell, but also along the identified routes.

Figure 8:
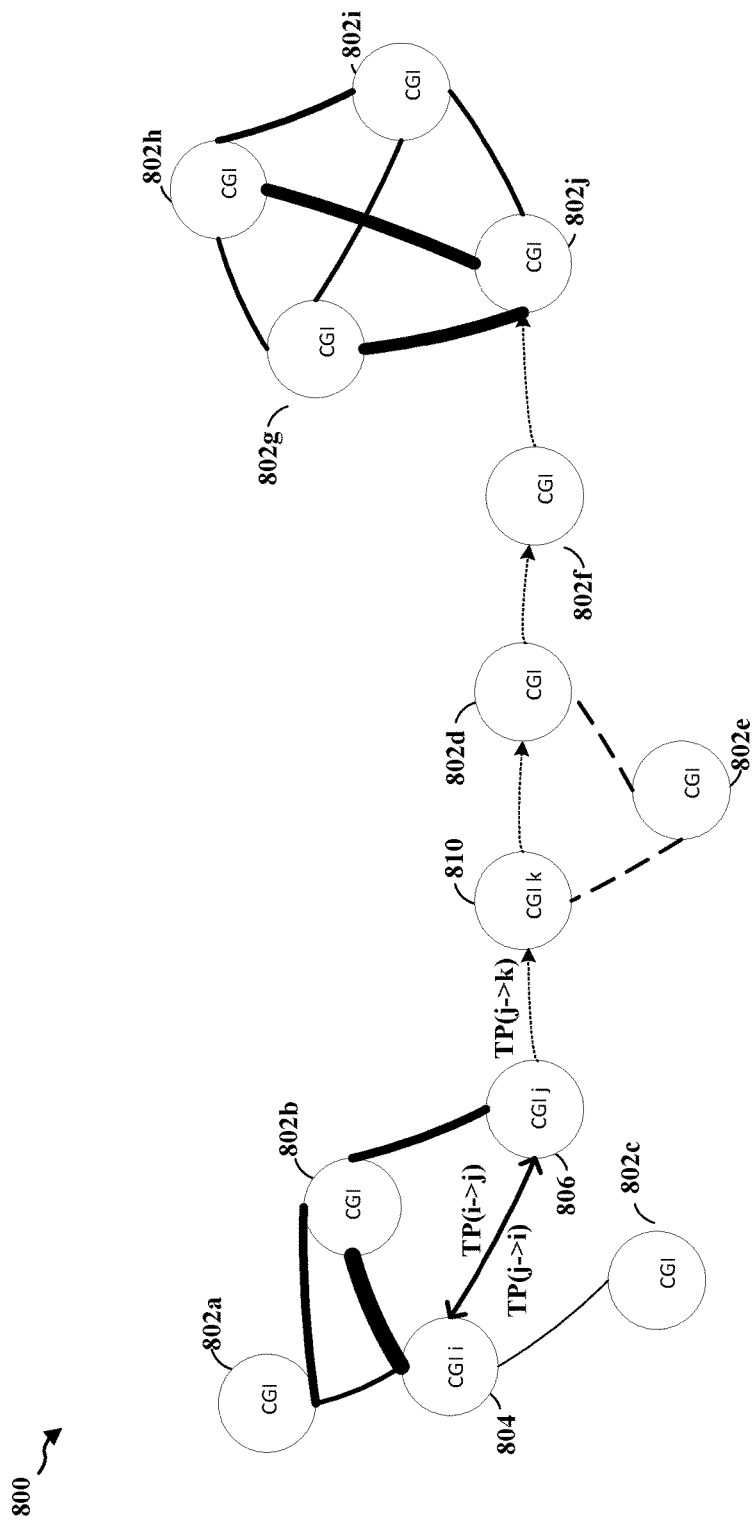
FIG. 8 is a conceptual diagram illustrating an aspect of a mobility representation in accordance with various aspects of the present disclosure.

Mobility determination component 428 may utilize dwell time information, camped count information, and inter-RAT count information from the cell history database 430 in forming the clustering determination. For example, as shown in FIG. 8, an example weighted graph diagram may be formed where each CGI corresponds to a vertex and an edge may be formed between each CGI and a neighbor CGI if the inter-RAT count(i→j) is greater than a threshold such as a value of zero. Further, a weight of a vertex that represents a total dwell time at the corresponding CGI may be determined based on $w_v(i)=\text{DWELL\_TIME}(i) \times \text{CAMPED\_COUNT}(i)$. Additionally, a weight of an edge between two CGIs (e.g., vertex$_i$ and vertex$_j$) may represent a number of times the UE 104 handed over from one CGI/cell to another CGI/cell and may be determined based on $w_e(i,j)=\text{IRAT\_COUNT}(i \to j)$.

Mobility determination component 428 may determine transition probabilities between CGIs that indicate a likelihood that a UE 104 may move from one CGI or cell to another CGI or cell based on a history of past movement. For example, mobility determination component 428 may determine transition probabilities are determined based on the weight of the vertex (e.g., CGI) and the edge between the vertex and another CGI. Specifically, mobility determination component 428 may determine a probability UE 104 remains at the same cell (e.g., node) based on the following expression:

$$TP(i \to i) = \frac{w_v(i)}{w_v(i) + \sum_{j \in \text{one-hop neighbors}} [w_v(j)]}$$

where TP(i→i) is the ratio of the weight of the vertex of that node to the weight of all its neighbors. As such, if the weight of the vertex is large compared to the neighbors, then there may be a large probability that the UE 104 remains at that node.

Further, mobility determination component 428 may determine a probability UE 104 moves from node$_i$ to node$_j$ based on the following expression:

$$TP(i \to j) = \frac{w_e(i, j)}{\sum_{k \in \text{one-hop neighbors}} [w_e(i, k)]} \times (1 - TP(i \to i))$$

where a large edge weight may indicate that in the past the UE 104 has moved to that cell a number of times. As such, if the edge is larger compared to the others, then the ratio may be larger, which may indicate that the cell is likely going to be the next cell. Mobility determination component 428 may determine the likely next hop or cell in a route based on whether TP(i→k)>next hop threshold.

In some aspects, base station 102 may include device configuration component 440, which may be configured to receive and store within device history database 450 cell history information from one or more UEs including UE 104 (e.g., from cell history database 430) so as to configure UE and/or network communication via any one or more of measurement trigger adjustment component 442, frequency configuration component 444, cluster determination component 446, and/or mobility determination component 448, according to a plurality of UE cell history data for more robust optimizations. In some aspects, each of measurement trigger adjustment component 442, frequency configuration component 444, cluster determination component 446, and/or mobility determination component 448 may perform similar functions to those of measurement trigger adjustment component 422, frequency configuration component 424, cluster determination component 426, and/or mobility determination component 428, respectively. In some aspects, device history database 450 may store cell history information from one or more UEs including cell history database 430 of UE 104. In some aspects, device configuration component 440 may crowd-source cell history information at an independent server and then transmit or inform one or more UEs.

Figure 5:
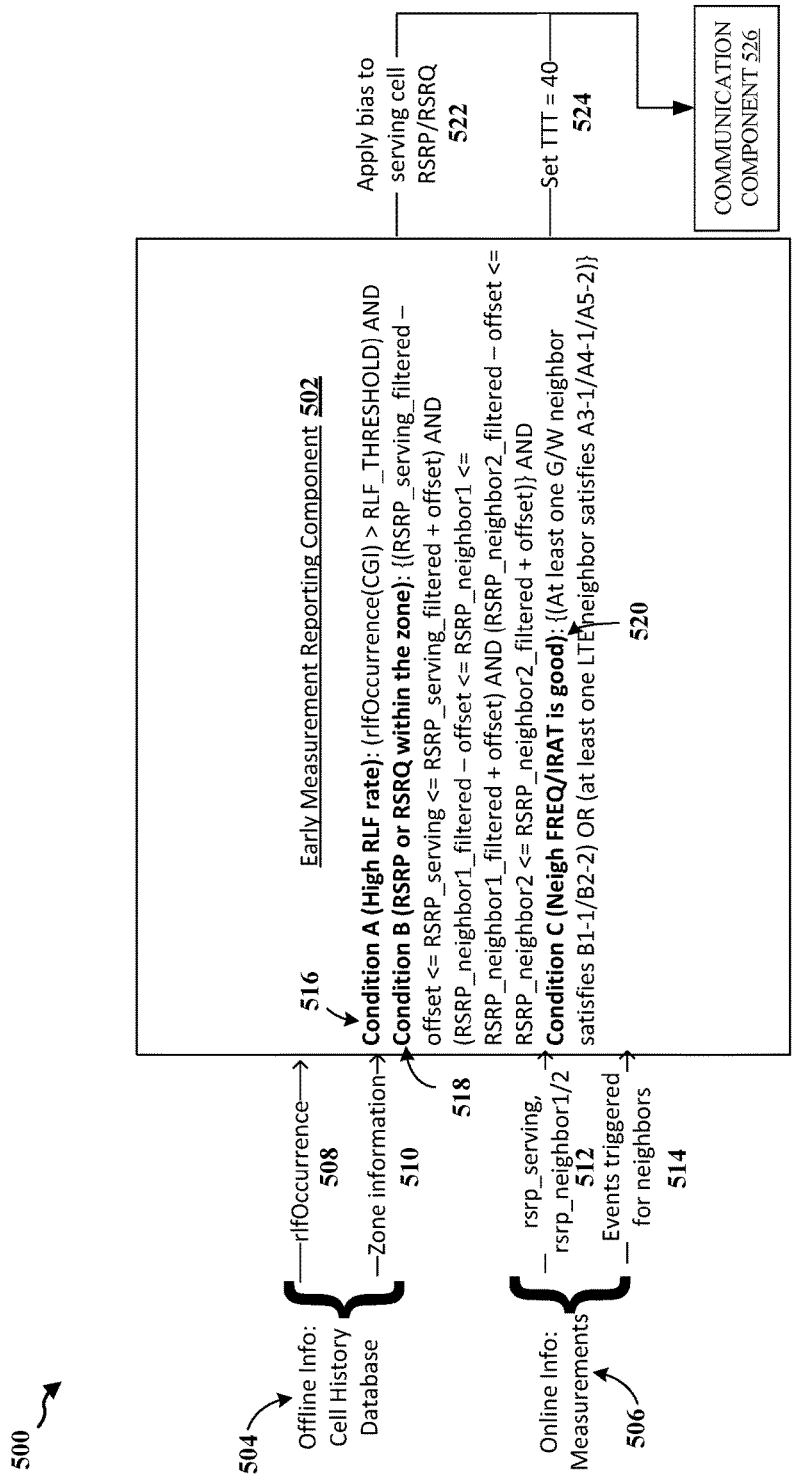
FIG. 5 is a diagram illustrating an aspect of early measurement reporting component in accordance with various aspects of the present disclosure.

FIG. 5 is a diagram illustrating a non-limiting aspect of early measurement reporting component 502. In some aspects, early measurement reporting component 502 may be part of measurement trigger adjustment component 422 (FIG. 4). Early measurement reporting component 502 may trigger early measurement reporting to a communication component 526 for mitigating potential RLFs in known troubled zones or cells. Early measurement reporting component 502 may receive or otherwise obtain both offline information 504 from cell history database 504 including the RLF occurrence values 508 and zone information 520, as well as online information 506 measurements including the RSRP of the serving cell and the RSRP values of the first and second neighbor cells 512, and the events triggered for neighbor cells 514.

To trigger early measurement reporting, early measurement reporting component 502 may determine, at condition A 516, whether an RLF occurrence value satisfies (e.g., meets or exceeds) an RLF occurrence threshold, determine, at condition B 518, whether the RSRP or RSRQ values are within the zone, and/or determine, at condition C 520, whether the neighbor frequency or inter-RAT is suitable for selection/reselection/handover based on determining whether a neighbor cell satisfies B1, B2, A3, A4, and/or A5 measurement events of 3GPP TS 36.331. Based on determination that conditions A 516, B 518, and/or C 520 are satisfied, early measurement reporting component 502 may apply a bias to serving cell to adjust (e.g., reduce) one or both of the current RSRP and RSRQ values by a corresponding reduction value and/or set the TTT value to a reduced value (e.g., 40 ms) to trigger early measurement reporting to communication component 526.

Figure 6:
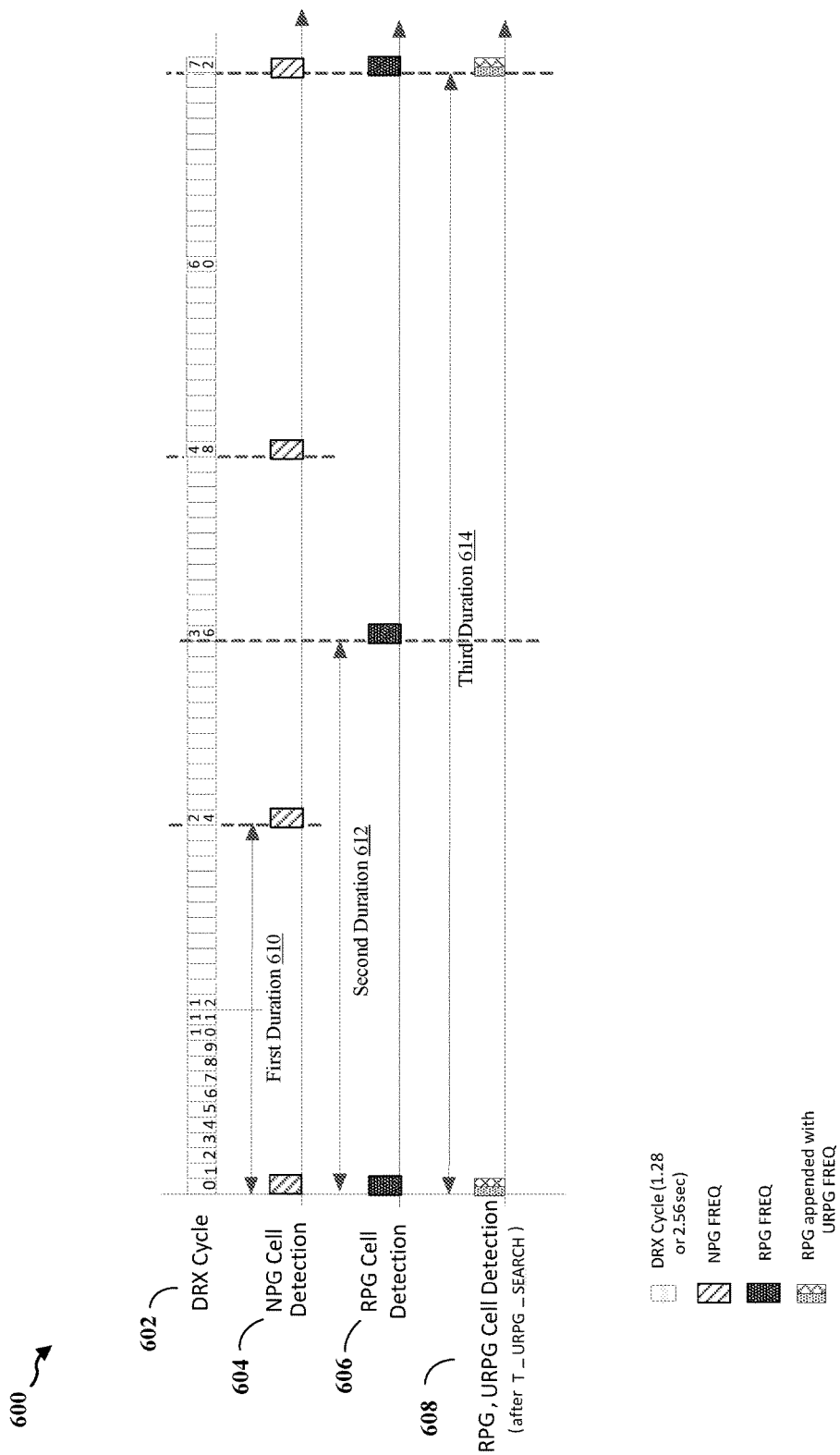
FIG. 6 is a diagram illustrating an aspect of a frequency search scheme in accordance with various aspects of the present disclosure.

FIG. 6 is a diagram illustrating a frequency search scheme 600 for various cell detections. For example, the frequency search scheme 600 may performed at least in part by the frequency configuration component 424 (FIG. 4). Specifically, the frequency search scheme 600 may optimize cell search based on a history of detected frequencies. The frequency search scheme 600 enables searching for one or more cells within a given frequency during at least one DRX cycle 602.

For instance, an NPG frequency may be searched periodically as part of an NPG cell detection 604 after a first duration 610 (e.g., once every 24 DRX cycles). Further, an RPG frequency may be periodically searched as part of an RPG cell detection 606 after a second duration 612. Additionally, a URPG frequency may be periodically searched as part of an RPG, URPG cell detection 608 after a third duration 614. An RPG frequency appended with a URPG frequency may be searched upon expiry of a timer and searched for 'n' consecutive rounds of search.

FIG. 7 is a conceptual diagram illustrating an aspect of a cell clustering representation 700. In some aspects, the cell clustering representation 700 may be formed or otherwise determined using cluster determination component 426 (FIG. 4). As shown in FIG. 7, two clusters may be determined based at least on weighted vertices of the CGIs and edges formed between CGIs. Specifically, first cluster 720 may be formed based on identifying CGI 704 as the root node and CGIs 702a, 702b, 702c and 706 as weighted edges forming the cluster. Further, a weighted representation between $CGI_j$ 706 and $CGI_k$ 710 may indicate a probability of a mobility of UE 104 (e.g., determined via mobility determination component 428). Further, a second cluster 730 may be formed based on identifying one of CGIs 702g, 702h, 702i, and/or 702j as a root node with the other CGIs forming nodes within the cluster based on having an edge with the root node satisfying $W_e$>edge threshold. In some aspects, a weight of the edge, represented by thickness in the figure, between the CGIs may represent a number of times the UE has performed handover between the CGIs/cells.

FIG. 8 is a conceptual diagram illustrating an aspect of a mobility representation 800. In some aspects, the mobility representation may represent, in graphical form, a movement or likely movement of UE 104 (FIG. 4) from and to one or more locations serviced by a corresponding CGI along a route. For example, CGIs 802a-802j, 804, 806, 810 may represent cells within a communication network. The weight of the edges, represented by thickness of the lines in the figure, between two CGIs may be edges that represent the inter-RAT counter value (e.g., number of times the UE has handed over to/from the cells). During a mobility scenario, UE 104 may move from $CGI_i$ 804 to $CGI_j$ 806. At $CGI_j$ 806, the UE 104 may determine that a transition probability TP(j→k) exceeds a transition probability threshold, and as such, the UE 104 is likely to move to $CGI_k$ as the next hop.

Figure 9:
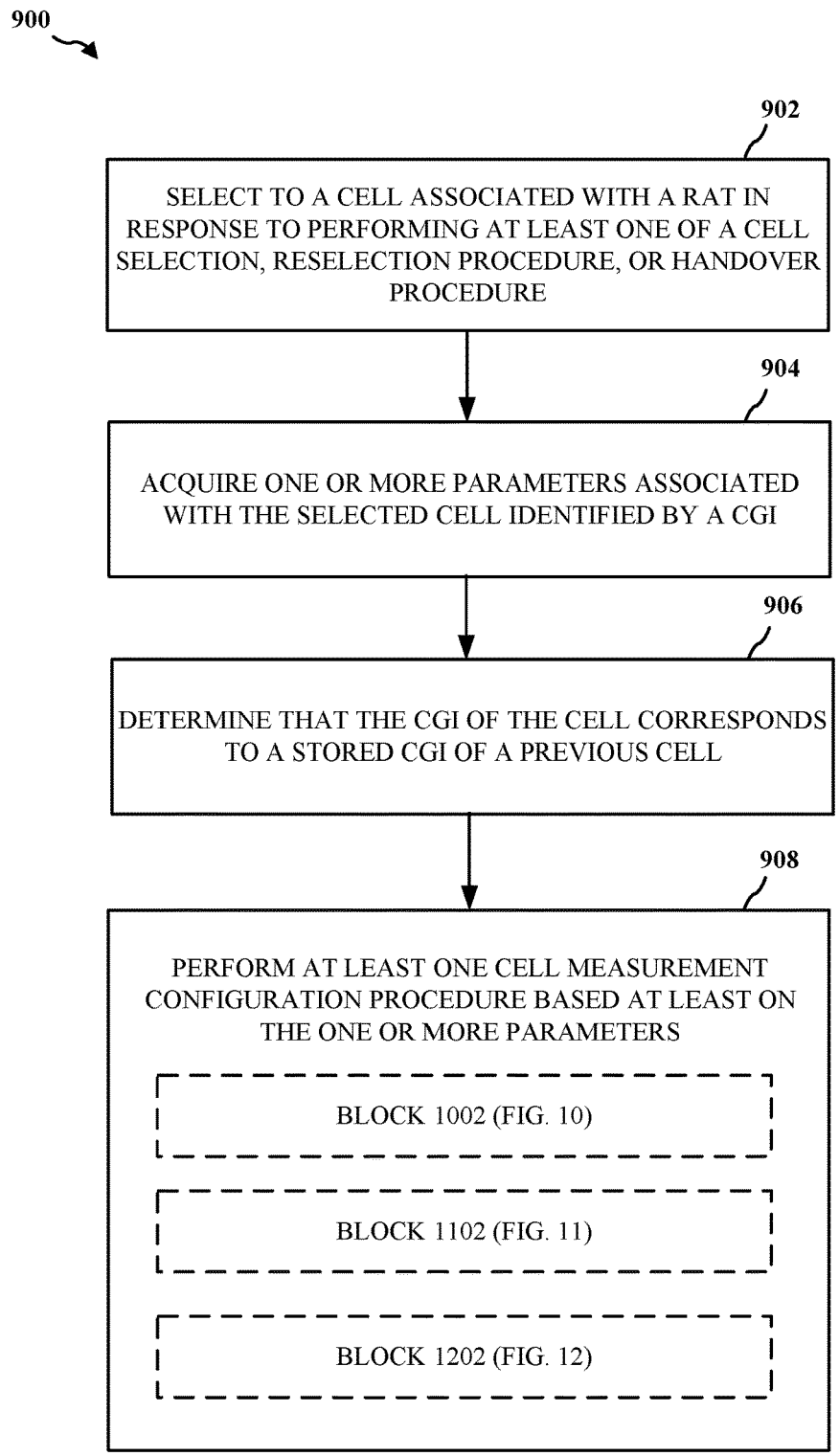
FIG. 9 is a flow diagram of an aspect of communication at a UE in a wireless communication system, which may be executed by the communication configuration component FIG. 4.

Referring to FIG. 9, a UE such as UE 104 (FIGS. 1 and 4) may include one or more processors to perform an aspect of a method 900 for performing at least one cell measurement configuration procedure. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

At block 902, method 900 may select to a cell associated with a RAT in response to performing at least one of a cell selection, reselection procedure, or handover procedure. For example, in an aspect, UE 104 (FIG. 4) may execute one or more communication components (e.g., as in FIG. 3) to select to a cell of base station 102 (FIG. 4) associated with a RAT (e.g., LTE) in response to performing a first procedure, where the first procedure may include at least one of a cell selection procedure, a cell reselection procedure or a handover procedure.

At block 904, method 900 may acquire one or more parameters associated with the selected cell identified by the CGI. For example, in an aspect, UE 104 (FIG. 4) may execute communication configuration component 420 (FIG. 4) to acquire one or more parameters associated with the selected cell identified by a corresponding CGI. In some aspects, the one or more cell parameters may include at least one of neighbor cell information, CGI metric information, or cell performance metric information. Further, in some aspects, the one or more cell parameters include at least one of a neighbor CGI list, a neighbor frequency PLMN list, a WLAN BSSID list, a dwell time representing a time duration the UE is camped on the cell, a camped counter value representing a number of selections of the cell by the UE, or an inter-RAT counter value representing a number of connection state transitions between the cell and at least another cell.

At block 906, method 900 may determine that the CGI of the cell corresponds to a stored CGI of a previous cell. For example, in an aspect, UE 104 (FIG. 4) may execute communication configuration component 420 (FIG. 4) to determine that the CGI of the cell corresponds to a stored CGI of a previous cell stored in cell history database 430 (FIG. 4).

At block 908, method 900 may perform at least one communication configuration procedure based at least on the one or more parameters. For example, in an aspect, UE 104 (FIG. 4) may execute communication configuration component 420 (FIG. 4) to perform at least one second procedure based on determining that the CGI of the cell corresponds to the stored CGI of the previous cell, where the second procedure may include a communication configuration procedure based at least on the one or more parameters. For example, as part of performing at least one cell measurement configuration procedure, method 900 may proceed to or include block 1002 (FIG. 10), block 1102 (FIG. 11), and/or block 1202 (FIG. 12).

Figure 10:
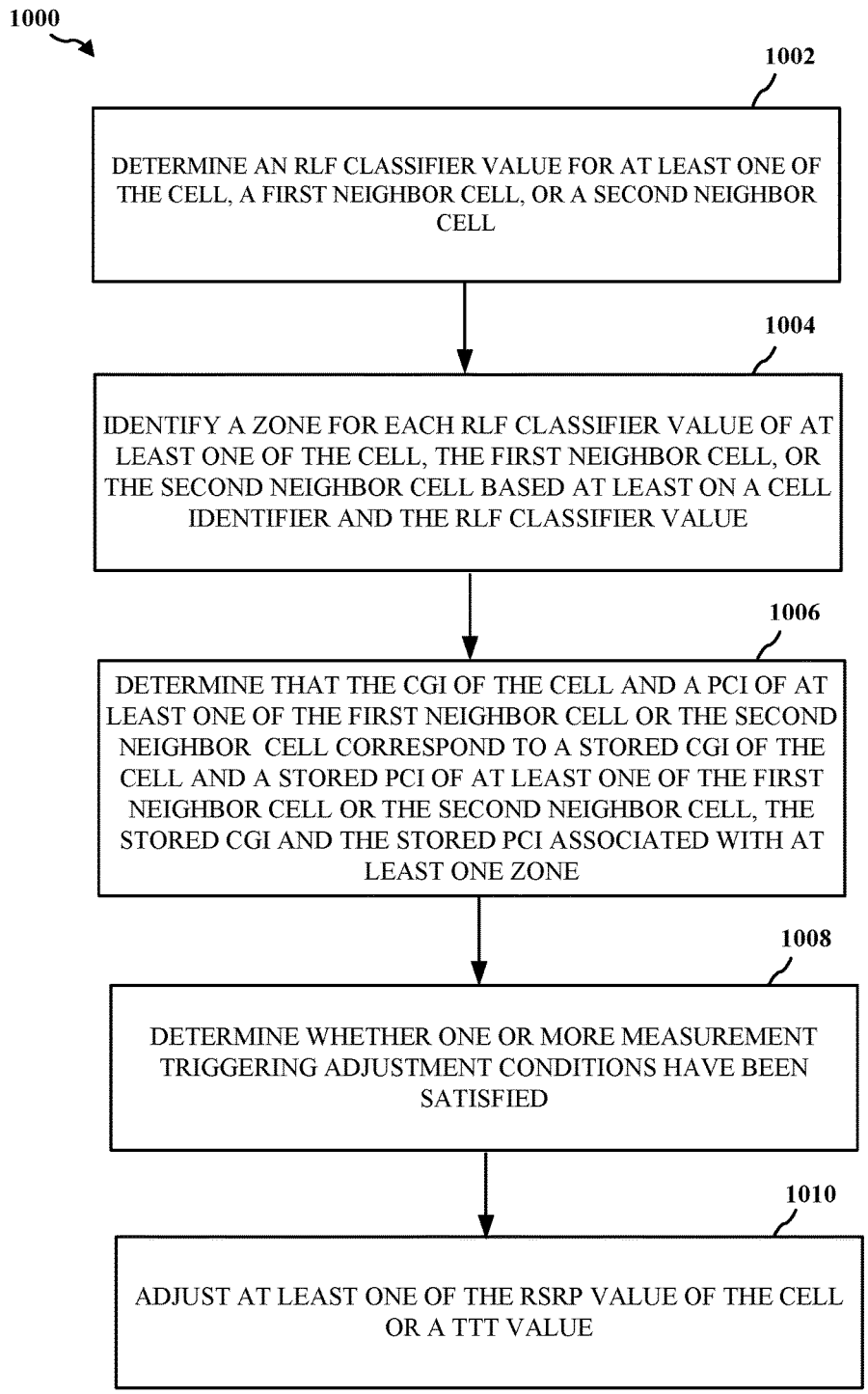
FIG. 10 is a flow diagram of an aspect of triggering early measurement reporting, which may be executed by the measurement trigger adjustment component of FIG. 4.

Referring to FIG. 10, a UE such as UE 104 (FIGS. 1 and 4) may include one or more processors to perform an aspect of a method 900 for triggering early measurement reporting. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 1002, method 1000 may determine an RLF classifier value for at least one of the cell, a first neighbor cell, or a second neighbor cell. For example, in an aspect, UE 104 (FIG. 4) and/or communication configuration component 420 (FIG. 4) may execute measurement trigger adjustment component 422 (FIG. 4) to determine an RLF classifier value (e.g., bin) for at least one of the selected cell (e.g., serving cell of base station 102, FIG. 4), a first neighbor cell of or associated with the selected cell, or a second neighbor cell of or associated with the selected cell, each RLF classifier value corresponding to a distinct RSRP range associated with an occurrence of an RLF within the distinct RSRP range.

At block 1004, method 1000 may identify a zone for each RLF classifier value of at least one of the cell, the first neighbor cell, or the second neighbor cell based at least on a cell identifier and the RLF classifier value. For example, in an aspect, UE 104 (FIG. 4) and/or communication configuration component 420 (FIG. 4) may execute measurement trigger adjustment component 422 (FIG. 4) to identify a zone for each RLF classifier value of at least one of the cell, the first neighbor cell, or the second neighbor cell based at least on a cell identifier and the RLF classifier value.

At block 1006, method 1000 may determine that the CGI of the cell and a PCI of at least one of the first neighbor cell or the second neighbor cell correspond to a stored CGI of the cell and a stored PCI of at least one of the first neighbor cell or the second neighbor cell, the stored CGI and the stored PCI associated with at least one zone. For example, in an aspect, UE 104 (FIG. 4) and/or communication configuration component 420 (FIG. 4) may execute measurement trigger adjustment component 422 (FIG. 4) to determine that the CGI of the selected cell (e.g., serving cell) and a PCI of at least one of the first neighbor cell or the second neighbor cell correspond to a stored CGI of the cell and a stored PCI of at least one of the first neighbor cell or the second neighbor cell (e.g., within cell history database 430, FIG. 4). In some aspects, both the stored CGI and the stored PCI may be associated with at least one same zone.

At block 1008, method 1000 may determine whether one or more measurement triggering adjustment conditions have been satisfied. For example, in an aspect, UE 104 (FIG. 4) and/or communication configuration component 420 (FIG. 4) may execute measurement trigger adjustment component 422 (FIG. 4) to determine whether one or more measurement triggering adjustment conditions have been satisfied. In some aspects, the one or more parameters may include an RLF occurrence value representing a number of RLFs between the UE 104 (FIG. 4) and the cell (e.g., of base station 102, FIG. 4).

In some aspects, determining whether one or more measurement triggering adjustment conditions have been satisfied may include one or more of determining whether the RLF occurrence value of the selected cell satisfies an RLF occurrence threshold value corresponding to a number of RLFs indicative of poor network conditions between the UE and at least the selected cell, determining whether at least one of an RSRP value of the selected cell or an RSRP value of at least one of the first neighbor cell or the second neighbor cell falls within an offset of a respective stored RSRP value associated with the at least one zone, or determining whether at least one of the first neighbor cell, the second neighbor cell, or other neighbor cells satisfies a handover condition.

At block 1010, method 1000 may adjust at least one of the RSRP value of the cell or a TTT value in response to a determination that the one or more measurement triggering adjustment conditions have been satisfied. For example, in an aspect, UE 104 (FIG. 4) and/or communication configuration component 420 (FIG. 4) may execute measurement trigger adjustment component 422 (FIG. 4) to adjust at least one of the RSRP value of the cell or a TTT value in accordance with a determination that the one or more measurement triggering adjustment conditions have been satisfied.

In some aspects, adjusting at least one of the RSRP value of the cell or the TTT value may include reducing the RSRP value of the selected cell by a first reduction value or modifying the TTT value from a first time value to a second time value smaller than the first value. Further, in some aspects, the adjusting may further include reducing an RSRP value of at least one of the first neighbor cell or the second neighbor cell by a second reduction value the same as or distinct from the first reduction value.

Figure 11:
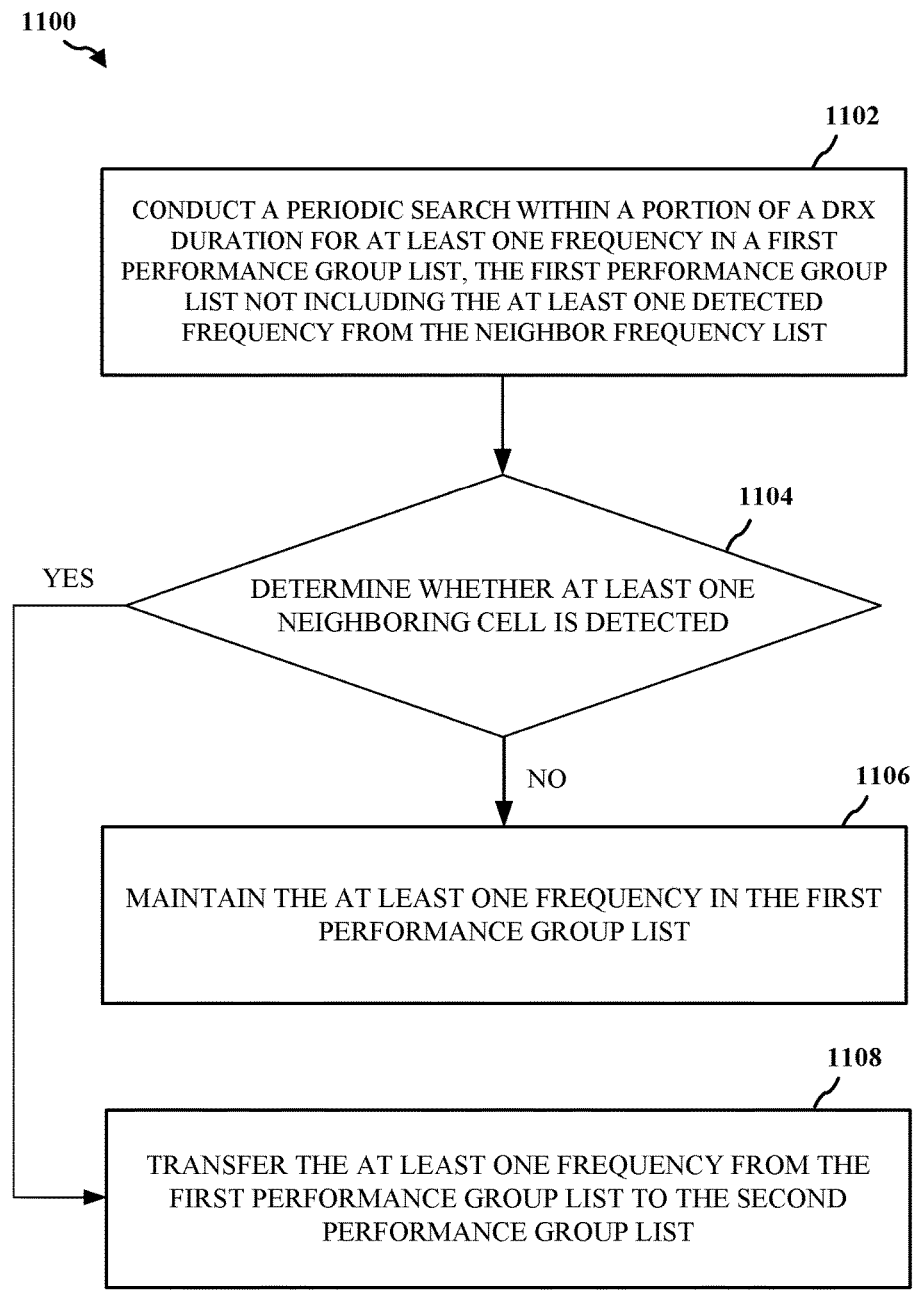
FIG. 11 is a flow diagram of an aspect of cell frequency searching, which may be executed by the frequency configuration component of FIG. 4.
Figure 12:
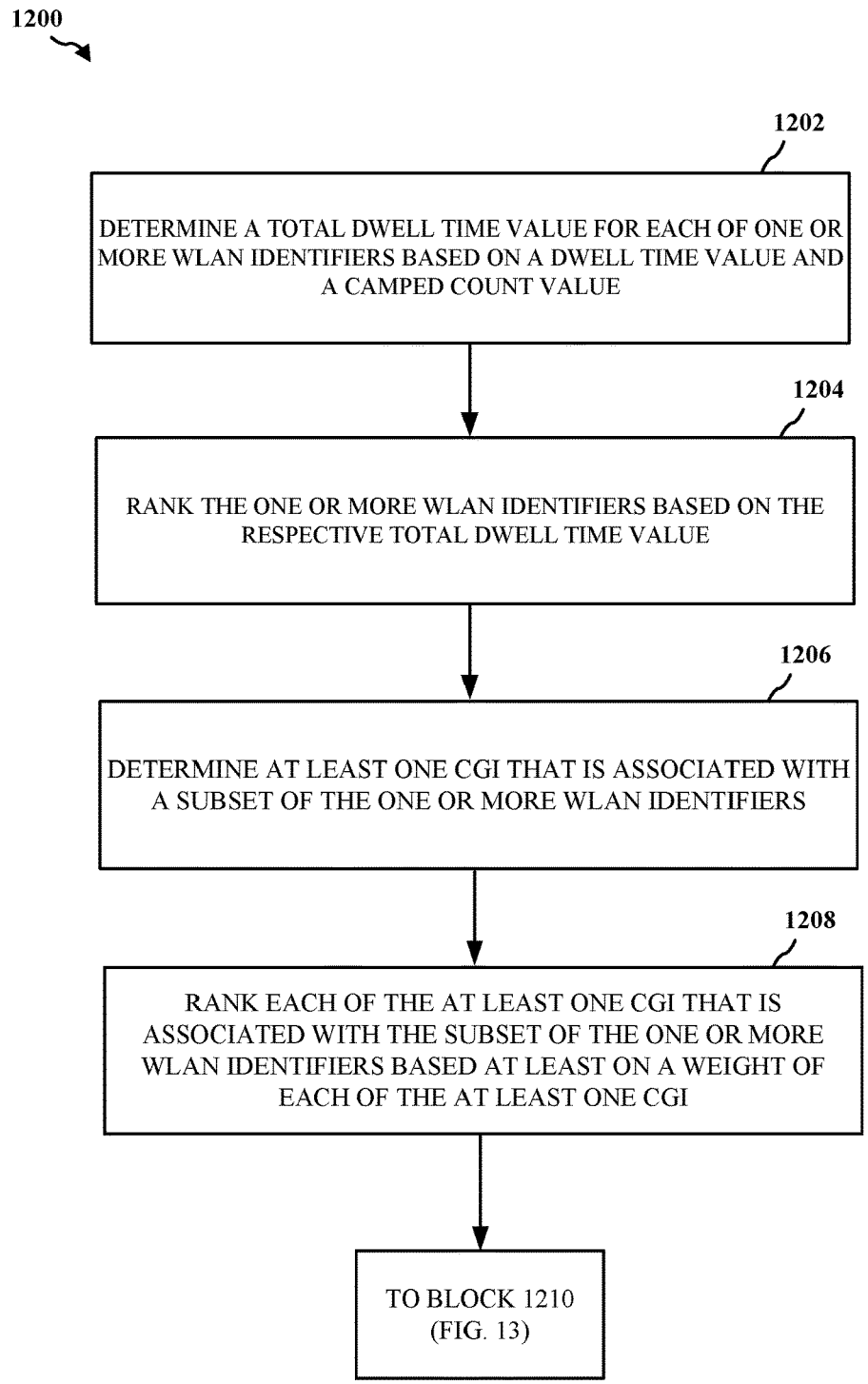
FIGS. 12 and 13 is a flow diagram of an aspect of a cell cluster and mobility determinations, which may be executed by the cluster determination component and/or mobility determination component of FIG. 4.

Referring to FIG. 11, a UE such as UE 104 (FIGS. 1 and 4) may include one or more processors to perform an aspect of a method 900 for optimizing cell frequency search. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

At block 1102, method 1100 may conduct a periodic search within a portion of a DRX duration for at least one frequency in a first performance group list, the first performance group list not including the at least one detected frequency from the neighbor frequency list. For example, in an aspect, UE 104 (FIG. 4) and/or communication configuration component 420 (FIG. 4) may execute measurement frequency configuration component 424 (FIG. 4) to conduct a periodic search within a portion of a DRX duration for at least one frequency in a first performance group list (e.g., ultra-reduced performance group), the first performance group list not including the at least one detected frequency from the neighbor frequency list.

In some aspects, the one or more parameters may include a neighbor frequency list having at least one detected frequency of a neighboring cell. Further, in some aspects, conducting the periodic search may include appending the at least one frequency in the first performance group list (e.g., ultra-reduced performance group list) with at least one frequency from a second performance group list (e.g., reduced performance group list).

At block 1104, method 1100 may determine whether at least one neighboring cell is detected based on conducting the periodic search within the portion of a discontinuous reception duration for the at least one frequency. For example, in an aspect, UE 104 (FIG. 4) and/or communication configuration component 420 (FIG. 4) may execute measurement frequency configuration component 424 (FIG. 4) to determine whether at least one neighboring cell is detected based on conducting the periodic search within the portion of a discontinuous reception duration for the at least one frequency.

Method 1100 may proceed to block 1106 based on a determination that at least one neighboring cell is not detected based on conducting the periodic search. Specifically, at block 1106, method 1100 may maintain the at least one frequency in the first performance group list. For example, in an aspect, UE 104 (FIG. 4) and/or communication configuration component 420 (FIG. 4) may execute measurement frequency configuration component 424 (FIG. 4) to maintain the at least one frequency in the first performance group list in accordance with a determination that at least one neighboring cell is not detected based on conducting the periodic search.

Method 1100 may proceed to block 1108 based on a determination that at least one neighboring cell is detected based on conducting the periodic search. Specifically, at block 1108, method 1100 may transfer the at least one frequency from the first performance group list to the second performance group list. For example, in an aspect, UE 104 (FIG. 4) and/or communication configuration component 420 (FIG. 4) may execute measurement frequency configuration component 424 (FIG. 4) to transfer the at least one frequency from the first performance group list to the second performance group list in accordance with a determination that at least one neighboring cell is detected based on conducting the periodic search.

Figure 13:
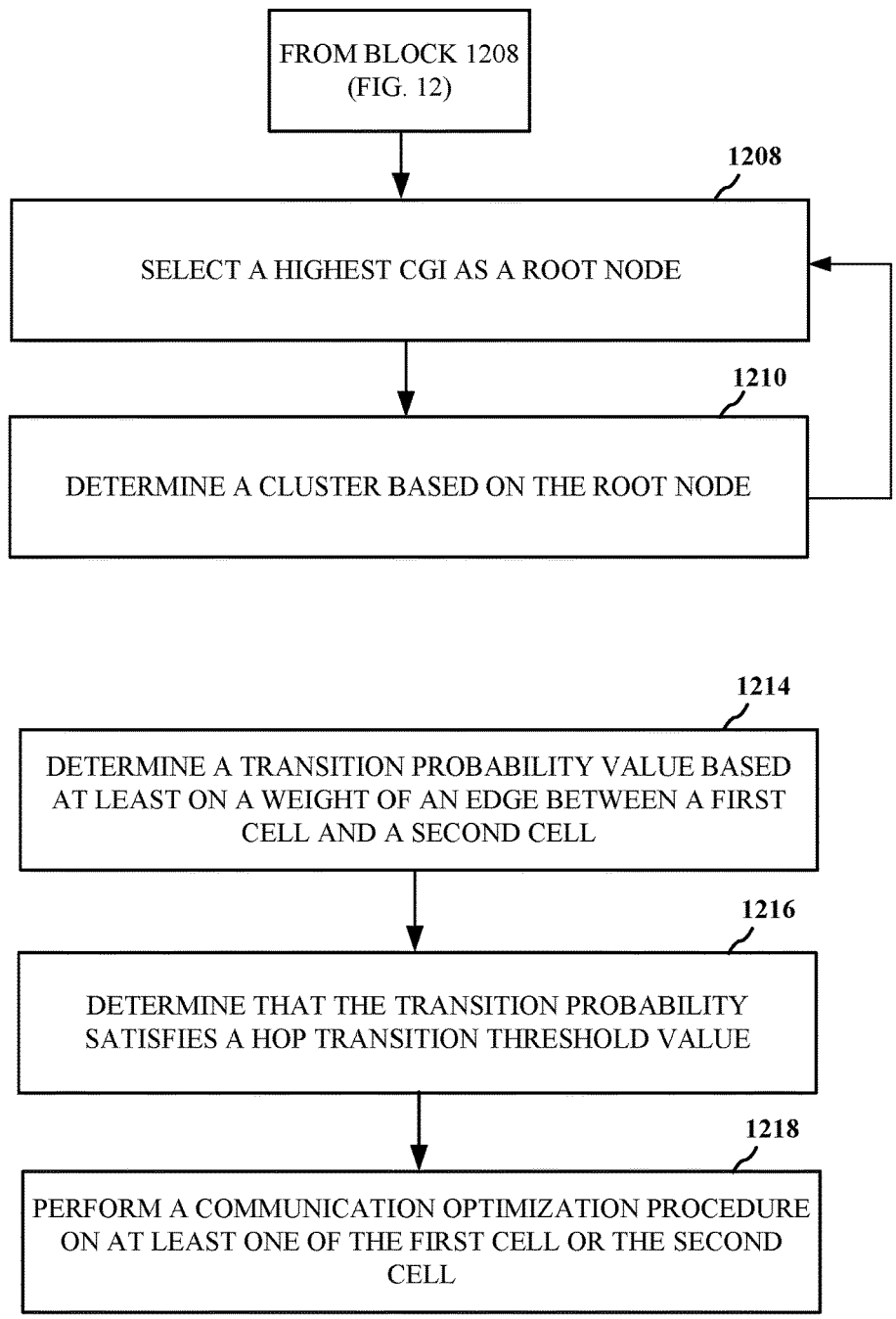

Referring to FIGS. 12 and 13, a UE such as UE 104 (FIGS. 1 and 4) may include one or more processors to perform an aspect of a method 900 for clustering one or more cells and determining UE mobility. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

At block 1202, method 1200 may determine a total dwell time value for each of one or more WLAN identifiers based on a dwell time value and a camped count value. For example, in an aspect, UE 104 (FIG. 4) and/or communication configuration component 420 (FIG. 4) may execute cluster determination component 426 (FIG. 4) to determine a total dwell time value for each of one or more WLAN identifiers based on a dwell time value and a camped count value. In some aspects, the one or more WLAN identifiers may be Wi-Fi BSSIDs.

At block 1204, method 1200 may rank the one or more WLAN identifiers based on the respective total dwell time value. For example, in an aspect, UE 104 (FIG. 4) and/or communication configuration component 420 (FIG. 4) may execute cluster determination component 426 (FIG. 4) to rank the one or more WLAN identifiers based on the respective total dwell time value (e.g., in descending order).

At block 1206, method 1200 may determine at least one CGI that is associated with a subset of the one or more WLAN identifiers. For example, in an aspect, UE 104 (FIG. 4) and/or communication configuration component 420 (FIG. 4) may execute cluster determination component 426 (FIG. 4) to determine at least one CGI that is associated with a subset of the one or more WLAN identifiers (e.g., determine the CGIs associated with the top 'N' BSSIDs).

At block 1208, method 1200 may rank each of the at least one CGI that is associated with the subset of the one or more WLAN identifiers based at least on a weight value of each of the at least one CGI. For example, in an aspect, UE 104 (FIG. 4) and/or communication configuration component 420 (FIG. 4) may execute cluster determination component 426 (FIG. 4) to rank each of the at least one CGI that is associated with the subset of the one or more WLAN identifiers based at least on a weight value of each of the at least one CGI.

At block 1210, method 1200 may select a highest CGI as a root node. For example, in an aspect, UE 104 (FIG. 4) and/or communication configuration component 420 (FIG. 4) may execute cluster determination component 426 (FIG. 4) to select a highest ranked CGI as a root node from which surrounding nodes/CGIs may be identified as forming the cluster.

At block 1212, method 1200 may determine a cluster based on the root node. For example, in an aspect, UE 104 (FIG. 4) and/or communication configuration component 420 (FIG. 4) may execute cluster determination component 426 (FIG. 4) to determine a cluster based on the root node and, in some aspects, a maximum depth of a number of edges. In some aspects, a node may be admitted to a cluster if an edge in cluster satisfies an weighted edge threshold value representing a minimum number of inter-RAT count values that may be sufficient for addition to the cluster.

In some aspects, method 1200 may proceed to block 1214 from block 1202, or in some aspects, may begin at block 1214. At block 1214, method 1200 may determine a transition probability value based at least on a weight of an edge between a first cell and a second cell. For example, in an aspect, UE 104 (FIG. 4) and/or communication configuration component 420 (FIG. 4) may execute mobility determination component 428 (FIG. 4) to determine a transition probability value based at least on a weight of an edge between a first cell and a second cell.

At block 1216, method 1200 may determine that the transition probability satisfies a hop transition threshold value. For example, in an aspect, UE 104 (FIG. 4) and/or communication configuration component 420 (FIG. 4) may execute mobility determination component 428 (FIG. 4) to determine that the transition probability satisfies a hop transition threshold value.

At block 1218, method 1200 may perform a communication optimization procedure on at least one of the first cell or the second cell. For example, in an aspect, UE 104 (FIG. 4) and/or communication configuration component 420 (FIG. 4) may execute mobility determination component 428 (FIG. 4) to perform a communication optimization procedure on at least one of the first cell or the second cell.

Figure 14:
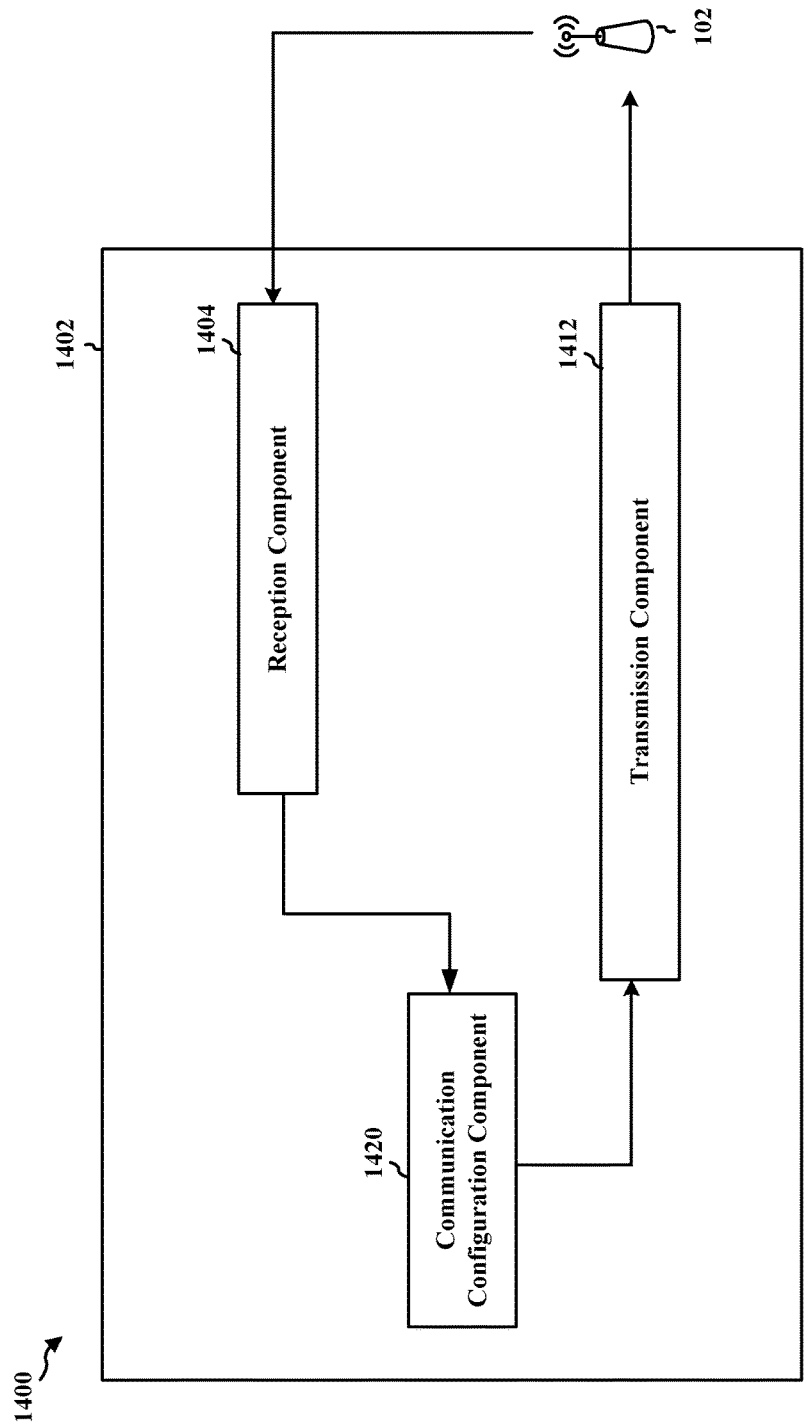
FIG. 14 is a conceptual data flow diagram illustrating the data flow between different means/components in an exemplary apparatus including a communication configuration component in accordance with various aspects of the present disclosure.

FIG. 14 is a conceptual data flow diagram 1400 illustrating the data flow between different means/components in an exemplary apparatus 1402 that includes communication configuration component 1420, which may be the same as or similar to communication configuration component 420. The apparatus 1402 may be a UE, which may include UE 104 of FIGS. 1 and 4. The apparatus 1402 includes reception component 1404 and a transmission component 1412 that, in an aspect, selects to a cell associated with a RAT in response to performing at least one of a cell selection, reselection procedure, or a handover procedure and acquires one or more parameters associated with the selected cell identified by a CGI. The apparatus 1402 includes communication configuration component 1420 that determines that the CGI of the cell corresponds to a stored CGI of a previous cell and performs at least one communication configuration procedure based at least on the one or more parameters.

The apparatus may include additional components that perform each of the blocks of the algorithm in the aforementioned flowcharts of FIG. 14. As such, each block in the aforementioned flowcharts of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
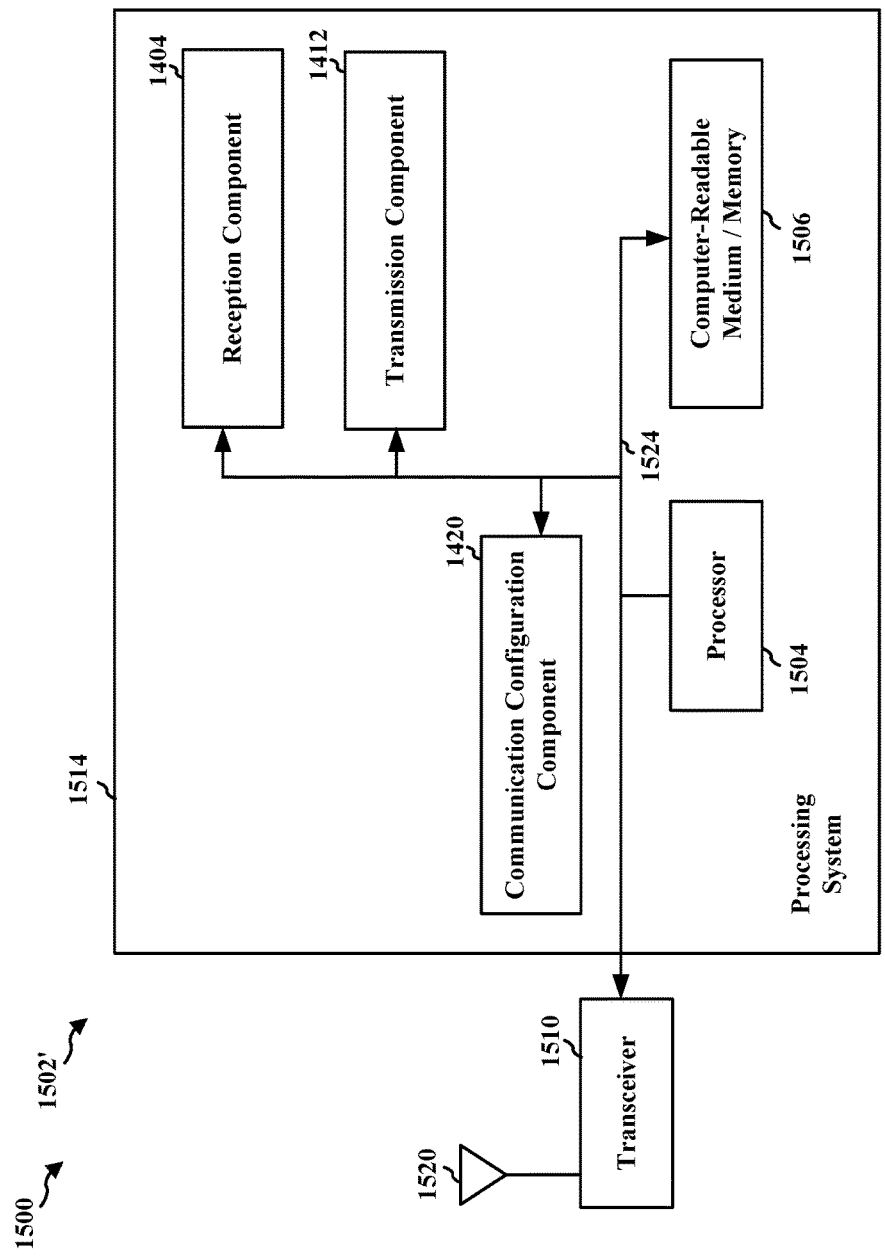
FIG. 15 is a diagram illustrating an example of a hardware implementation for an apparatus employing a processing system including a communication configuration component in accordance with various aspects of the present disclosure.

FIG. 15 is a diagram 1500 illustrating an example of a hardware implementation for an apparatus 1502' employing a processing system 1514 that includes communication configuration component 1420 (FIG. 14), which may be the same as or similar to communication configuration component 420. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1504, 1506, 1508, 1512, and 1520, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1504. In addition, the transceiver 1510 receives information from the processing system 1514, specifically the transmission component 1512, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1304 when executing software. The processing system 1514 further includes at least one of the components 1420, 1504, 1506, 1508, and 1512. The components may be software components running in the processor 1504, resident/stored in the computer readable medium/memory 1506, one or more hardware components coupled to the processor 1504, or some combination thereof.

In one configuration, the apparatus 1502/1502' for wireless communication includes means for selecting to a cell associated with a radio access technology (RAT) in response to performing a cell selection/reselection procedure, means for acquiring one or more parameters associated with a cell global identity (CGI) of the selected cell, and means for performing at least one communication configuration procedure based at least on the one or more parameters.

The aforementioned means may be one or more of the aforementioned components of the apparatus 1502 and/or the processing system 1514 of the apparatus 1502' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of communication at a user equipment (UE) operating within a wireless communication network, comprising:
    selecting to a cell associated with a radio access technology (RAT) in response to performing a first procedure, the first procedure including at least one of a cell selection procedure, a cell reselection procedure, or a handover procedure;
    acquiring one or more parameters associated with the selected cell identified by a cell global identity (CGI), wherein the one or more parameters include a neighbor frequency list having at least one detected frequency of a neighboring cell;
    determining that the CGI of the cell corresponds to a stored CGI of a previous cell; and
    performing at least one second procedure based on determining that the CGI of the cell corresponds to the stored CGI of the previous cell, the second procedure including a communication configuration procedure based at least on the one or more parameters, wherein performing the at least one communication configuration procedure includes conducting a periodic search within a portion of a discontinuous reception (DRX) duration for at least one frequency in a first performance group list, the first performance group list not including the at least one detected frequency from the neighbor frequency list.

2. The method of claim 1, wherein performing the communication configuration procedure includes:
    determining a radio link failure (RLF) classifier value for at least one of the selected cell, a first neighbor cell of the selected cell, or a second neighbor cell of the selected cell, each RLF classifier value corresponding to a distinct reference signal received power (RSRP) range associated with an occurrence of an RLF within the distinct RSRP range; and
    identifying a zone for each RLF classifier value of at least one of the selected cell, the first neighbor cell, or the second neighbor cell based at least on a cell identifier and the RLF classifier value.

3. The method of claim 2, wherein performing the communication configuration procedure includes:
    determining that the CGI of the selected cell and a physical cell identifier (PCI) of at least one of the first neighbor cell or the second neighbor cell correspond to a stored CGI of the selected cell and a stored PCI of at least one of the first neighbor cell or the second neighbor cell, the stored CGI and the stored PCI both associated with at least one zone;
    determining whether one or more measurement triggering adjustment conditions have been satisfied; and
    adjusting at least one of the RSRP value of the selected cell or a time-to-trigger (TTT) value in response to a determination that the one or more measurement triggering adjustment conditions have been satisfied.

4. The method of claim 3, wherein adjusting at least one of the RSRP value of the selected cell or the TTT value includes:
    reducing the RSRP value of the selected cell by a first reduction value, or
    modifying the TTT value from a first time value to a second time value smaller than the first value.

5. The method of claim 3, wherein the adjusting at least one of the RSRP value of the selected cell or the TTT value further includes reducing an RSRP value of at least one of the first neighbor cell or the second neighbor cell by a second reduction value the same as or distinct from the first reduction value.

6. The method of claim 3, wherein the one or more parameters include an RLF occurrence value representing a number of RLFs between the UE and the selected cell, and wherein determining whether one or more measurement triggering adjustment conditions have been satisfied includes:
    determining whether the RLF occurrence value of the selected cell satisfies an RLF occurrence threshold value corresponding to a number of RLFs indicative of poor network conditions between the UE and at least the selected cell;
    determining whether at least one of an RSRP value of the selected cell or an RSRP value of at least one of the first neighbor cell or the second neighbor cell falls within an offset of a respective stored RSRP value associated with the at least one zone; or determining whether at least one of the first neighbor cell or the second neighbor cell satisfies a handover condition.

7. The method of claim 1, wherein performing the communication configuration procedure includes:
   determining whether at least one neighboring cell is detected based on conducting the periodic search within the portion of a discontinuous reception duration for the at least one frequency;
   maintaining the at least one frequency in the first performance group list in accordance with a determination that at least one neighboring cell is not detected based on conducting the periodic search; and
   transferring the at least one frequency from the first performance group list to the second performance group list in accordance with a determination that at least one neighboring cell is detected based on conducting the periodic search.

8. The method of claim 7, wherein conducting the periodic search includes appending the at least one frequency in the first performance group list with at least one frequency from a second performance group list.

9. The method of claim 1, wherein the one or more parameters include at least one of neighbor cell information, CGI metric information, or cell performance metric information.

10. The method of claim 9, wherein the one or more cell parameters include at least one of:
    a neighbor CGI list, a neighbor frequency public land mobile network (PLMN) list,
    a wireless local access network (WLAN) basic service set identifier (BSSID) list, a dwell time representing a time duration the UE is camped on the selected cell,
    a camped counter value representing a number of selections of the selected cell by the UE, or
    an inter-radio access technology (RAT) counter value representing a number of connection state transitions between the selected cell and at least another cell.

11. The method of claim 1, wherein the RAT corresponds to Long Term Evolution (LTE).

12. An apparatus for communication within a wireless communication network, comprising:
    a memory; and
    at least one processor coupled to the memory and configured to:
       select to a cell associated with a radio access technology (RAT) in response to performing a first procedure, the first procedure including at least one of a cell selection procedure, a cell reselection procedure, or a handover procedure;
       acquire one or more parameters associated with the selected cell identified by a cell global identity (CGI), wherein the one or more parameters include a neighbor frequency list having at least one detected frequency of a neighboring cell;
       determine that the CGI of the cell corresponds to a stored CGI of a previous cell; and
       perform at least one second procedure based on a determination that the CGI of the cell corresponds to the stored CGI of the previous cell, the second procedure including a communication configuration procedure based at least on the one or more parameters, wherein to perform the communication configuration procedure, the at least one processor is further configured to conduct a periodic search within a portion of a discontinuous reception duration for at least one frequency in a first performance group list, the first performance group list not including the at least one detected frequency from the neighbor frequency list.

13. The apparatus of claim 12, wherein to perform the communication configuration procedure, the at least one processor is further configured to:
    determine a radio link failure (RLF) classifier value for at least one of the selected cell, a first neighbor cell of the selected cell, or a second neighbor cell of the selected cell, each RLF classifier value corresponding to a distinct reference signal received power (RSRP) range associated with an occurrence of an RLF within the distinct RSRP range; and
    identify a zone for each RLF classifier value of at least one of the selected cell, the first neighbor cell, or the second neighbor cell based at least on a cell identifier and the RLF classifier value.

14. The apparatus of claim 13, wherein to perform the communication configuration procedure, the at least one processor is further configured to:
    determine that the CGI of the selected cell and a physical cell identifier (PCI) of at least one of the first neighbor cell or the second neighbor cell correspond to a stored CGI of the selected cell and a stored PCI of at least one of the first neighbor cell or the second neighbor cell, the stored CGI and the stored PCI both associated with at least one zone;
    determine whether one or more measurement triggering adjustment conditions have been satisfied; and
    adjust at least one of the RSRP value of the selected cell or a time-to-trigger (TTT) value in in response to a determination that the one or more measurement triggering adjustment conditions have been satisfied.

15. The apparatus of claim 14, wherein to adjust at least one of the RSRP value of the selected cell or the TTT value, the at least one processor is further configured to:
    reduce the RSRP value of the selected cell by a first reduction value, or
    modify the TTT value from a first time value to a second time value smaller than the first value.

16. The apparatus of claim 14, wherein to adjust at least one of the RSRP value of the selected cell or the TTT value, the at least one processor is farther configured to reduce an RSRP value of at least one of the first neighbor cell or the second neighbor cell by a second reduction value the same as or distinct from the first reduction value.

17. The apparatus of claim 14, wherein the one or more parameters include an RLF occurrence value representing a number of RLFs between the UE and the selected cell, and wherein to determine whether one or more measurement triggering adjustment conditions have been satisfied, the at least one processor is further configured to:
    determine whether the RLF occurrence value of the selected cell satisfies an RLF occurrence threshold value corresponding to a number of RLFs indicative of poor network conditions between the UE and at least the selected cell;
    determine whether at least one of an RSRP value of the selected cell or an RSRP value of at least one of the first neighbor cell or the second neighbor cell falls within an offset of a respective stored RSRP value associated with the at least one zone; or
    determine whether at least one of the first neighbor cell or the second neighbor cell satisfies a handover condition.

18. The apparatus of claim 12, wherein to perform the communication configuration procedure, the at least one processor is further configured to:
   determine whether at least one neighboring cell is detected based on conducting the periodic search within the portion of a discontinuous reception duration for the at least one frequency;
   maintain the at least one frequency in the first performance group list in accordance with a determination that at least one neighboring cell is not detected based on conducting the periodic search; and
   transfer the at least one frequency from the first performance group list to the second performance group list in accordance with a determination that at least one neighboring cell is detected based on conducting the periodic search.

19. The apparatus of claim 18, wherein to conduct the periodic search, the at least one processor is further configured to append the at least one frequency in the first performance group list with at least one frequency from a second performance group list.

20. The apparatus of claim 12, wherein the one or more parameters include at least one of neighbor cell information, CGI metric information, or cell performance metric information.

21. The apparatus of claim 20, wherein the one or more cell parameters include at least one of:
   a neighbor CGI list, a neighbor frequency public land mobile network (PLMN) list,
   a wireless local access network (WLAN) basic service set identifier (BSSID) list,
   a dwell time representing a time duration the UE is camped on the selected cell,
   a camped counter value representing a number of selections of the selected cell by the UE, or
   an inter-radio access technology (RAT) counter value representing a number of connection state transitions between the selected cell and at least another cell.

22. The apparatus of claim 12, wherein the RAT corresponds to Long Term Evolution (LTE).

23. An apparatus for communication within a wireless communication network, comprising:
   means for selecting to a cell associated with a radio access technology (RAT) in response to performing a first procedure, the first procedure including at least one of a cell selection procedure, a cell reselection procedure, or a handover procedure;
   means for acquiring one or more parameters associated with the selected cell identified by a cell global identity (CGI), wherein the one or more parameters include a neighbor frequency list having at least one detected frequency of a neighboring cell;
   means for determining that the CGI of the cell corresponds to a stored CGI of a previous cell; and
   means for performing at least one second procedure based on determining that the CGI of the cell corresponds to the stored CGI of the previous cell, the second procedure including a communication configuration procedure based at least on the one or more parameters, wherein the means for performing the communication configuration procedure includes means for conducting a periodic search within a portion of a discontinuous reception duration for at least one frequency in a first performance group list, the first performance group list not including the at least one detected frequency from the neighbor frequency list.

24. The apparatus of claim 23, wherein the means for performing the communication configuration procedure includes:
   means for determining a radio link failure (RLF) classifier value for at least one of the selected cell, a first neighbor cell of the selected cell, or a second neighbor cell of the selected cell, each RLF classifier value corresponding to a distinct reference signal received power (RSRP) range associated with an occurrence of an RLF within the distinct RSRP range; and
   means for identifying a zone for each RLF classifier value of at least one of the selected cell, the first neighbor cell, or the second neighbor cell based at least on a cell identifier and the RLF classifier value.

25. The apparatus of claim 24, wherein the means for performing the communication configuration procedure includes:
   means for determining that the CGI of the selected cell and a physical cell identifier (PCI) of at least one of the first neighbor cell or the second neighbor cell correspond to a stored CGI of the selected cell and a stored PCI of at least one of the first neighbor cell or the second neighbor cell, the stored CGI and the stored PCI both associated with at least one zone;
   means for determining whether one or more measurement triggering adjustment conditions have been satisfied; and
   means for adjusting at least one of the RSRP value of the selected cell or a time-to-trigger (TTT) value in response to a determination that the one or more measurement triggering adjustment conditions have been satisfied.

26. The apparatus of claim 23, wherein the means for performing the communication configuration procedure includes:
   means for determining whether at least one neighboring cell is detected based on conducting the periodic search within the portion of a discontinuous reception duration for the at least one frequency;
   means for maintaining the at least one frequency in the first performance group list in accordance with a determination that at least one neighboring cell is not detected based on conducting the periodic search; and
   means for transferring the at least one frequency from the first performance group list to the second performance group list in accordance with a determination that at least one neighboring cell is detected based on conducting the periodic search.

27. A non-transitory computer-readable medium storing computer executable code for communication within a wireless communication network, comprising code for:
   selecting to a cell associated with a radio access technology (RAT) in response to performing a first procedure, the first procedure including at least one of a cell selection procedure, a cell reselection procedure, or a handover procedure;
   acquiring one or more parameters associated with the selected cell identified by a cell global identity (CGI), wherein the one or more parameters include a neighbor frequency list having at least one detected frequency of a neighboring cell;
   determining that the CGI of the cell corresponds to a stored CGI of a previous cell; and
   performing at least one second procedure based on determining that the CGI of the cell corresponds to the stored CGI of the previous cell, the second procedure including a communication configuration procedure based at least on the one or more parameters, wherein performing the at least one communication configuration procedure includes conducting a periodic search within a portion of a discontinuous reception (DRX) duration for at least one frequency in a first performance group list, the first performance group list not including the at least one detected frequency from the neighbor frequency list.

* * * * *